(12) United States Patent
Seto et al.

(10) Patent No.: US 6,417,942 B1
(45) Date of Patent: Jul. 9, 2002

(54) OPTICAL COMMUNICATION SYSTEM AND METHOD OF CONTROLLING OPTICAL COMMUNICATION SYSTEM

(75) Inventors: Ichiro Seto; Tazuko Tomioka, both of Tokyo; Shigeru Ohshima, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/243,121

(22) Filed: Feb. 3, 1999

(30) Foreign Application Priority Data

Mar. 20, 1998 (JP) .............................. 10-072642

(51) Int. Cl.[7] .............................................. H04B 10/08
(52) U.S. Cl. ..................... 359/110; 359/124; 359/125; 359/133; 359/145; 359/167; 359/173; 359/191; 455/501; 455/422; 455/426; 455/517
(58) Field of Search .................. 359/110, 124, 359/125, 133, 167, 173, 191, 145; 455/422, 426, 501, 517

(56) References Cited

U.S. PATENT DOCUMENTS 5,471,334 A * 11/1995 Masuda et al. ............. 359/177
5,615,034 A * 3/1997 Hori ........................... 359/110
5,689,355 A * 11/1997 Okubo et al. ............... 359/179
5,812,296 A * 9/1998 Tarusawa et al. ........... 359/173
5,986,782 A * 11/1999 Alexander et al. .......... 359/110

* cited by examiner

Primary Examiner—Leslie Pascal
Assistant Examiner—Hanh Phan
(74) Attorney, Agent, or Firm—Oblon, Spivak, McClelland, Maier & Neustadt, P.C.

(57) ABSTRACT

In this invention, there is provided an optical communication system comprising a plurality of sub-stations and a main station connected to the plurality of sub-stations via an optical transmission path. The plurality of sub-stations respectively comprise modulation section for modulating a wavelength of an optical signal which is transmitted from the respective sub-station to the main station via the transmission path containing information signals by using a control signal having a unique frequency allocated to the sub-station, arbitrary pairs of control signals having different frequency differences. The main station comprises an extraction section for extracting a beat noise component from the received signal which is converted the optical signals modulated by the modulation sections into at the photo-detector, and a determination section for determining two sub-stations that have produced beat noise on the basis of the frequency difference of an arbitrary pair of control signals contained in the beat noise component extracted by the extraction section.

28 Claims, 12 Drawing Sheets

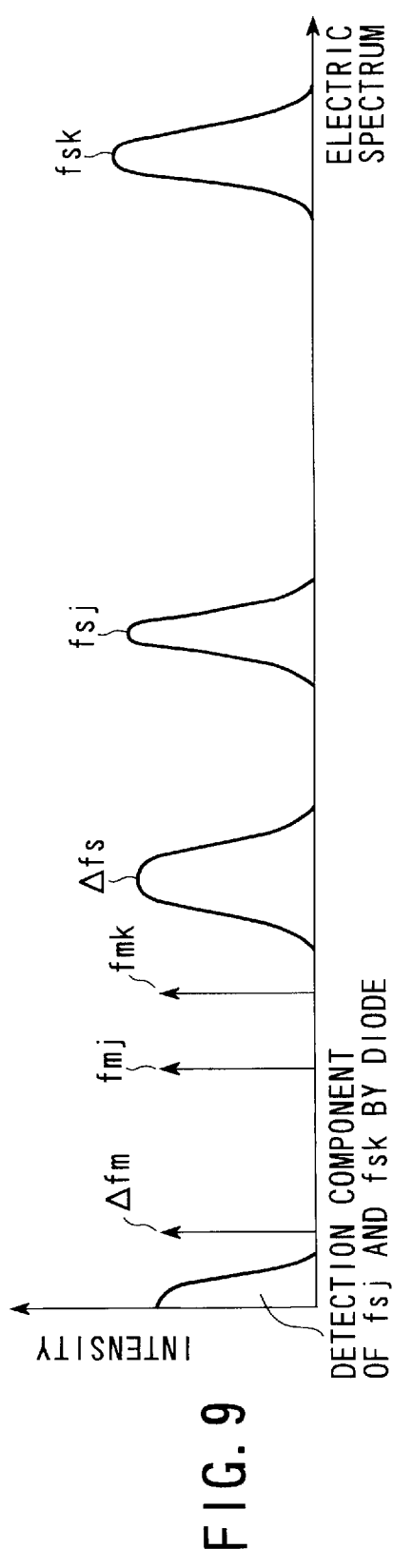
FIG. 9
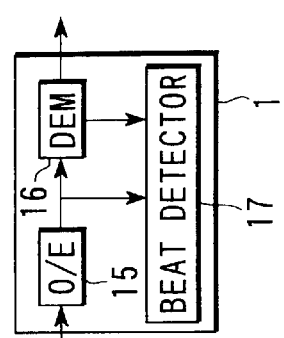
FIG. 10
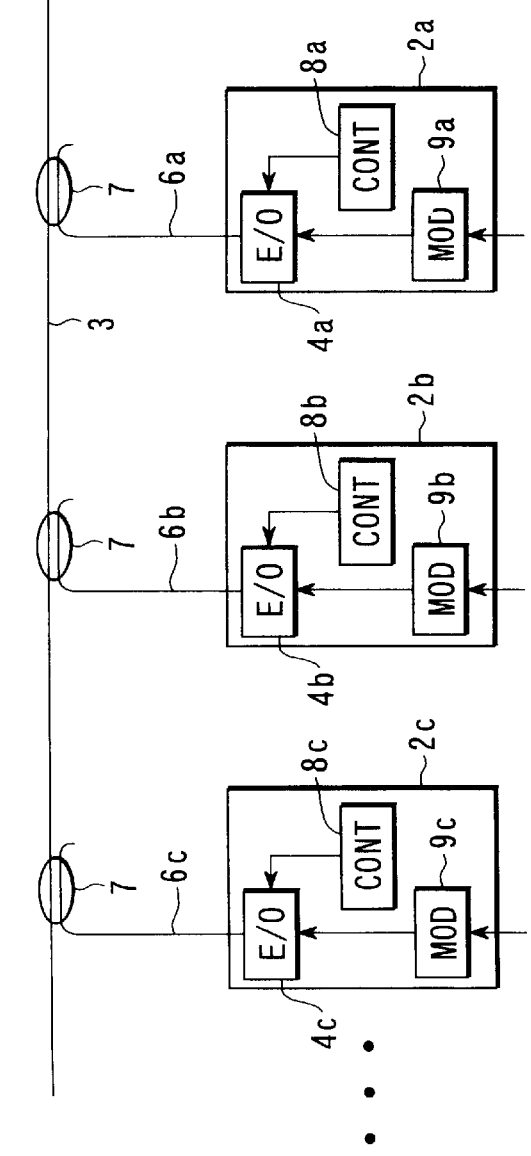

OPTICAL COMMUNICATION SYSTEM AND METHOD OF CONTROLLING OPTICAL COMMUNICATION SYSTEM

BACKGROUND OF THE INVENTION

The present invention relates to an optical communication system such as an optical CATV, optical ITV, or mobile communication system, which connects one main station and a plurality of sub-stations via an optical fiber and, more particularly, to an optical communication system which uses an optical wavelength multiplex technique in upstream signals from a sub-station to a main station, and a method of controlling the optical communication system.

Mobile communications represented by cellular phones, PHSs (personal handyphone system), and the like use radio, and have prevailed in recent years. However, since mobile communications use radio, they are often disrupted in a given area such as an underground mall, tunnel, dead zone of a base-station antenna in the shade of a building, and the like, where a radio wave is hard to reach.

In order to cover such uncommunicatable areas, sub-stations that are small-output stations are placed at various locations corresponding to the dead zones of a radio wave, thus providing communicatable areas to assure convenience for the users.

In this manner, a large number of sub-stations (base stations) that support the mobile communication system are placed in, e.g., an underground mall, tunnel, shade of a building, and the like where a radio wave is hard to reach. It is most preferable in terms of cost to feed a radio signal to such areas via optical fibers, and to use simple sub-stations (base stations) each having an antenna port module alone, as described in the article "The New Generation of Wireless Communications Based on Fiber-Radio Technologies" (IEICE Transaction on Communications vol. E76-B, no. 9, September 1993). Sub-stations connected via optical fibers are receiving lot of attention in an optical ITV (Industrial Televisions), CATV, and the like based on cable transmission, since a large number of sub-stations can be placed at various locations.

An optical network technique that accommodates a plurality of distributed sub-stations in a main station still suffers problems. One serious problem is beat noise produced upon interference of light sources of a plurality of sub-stations. The beat noise will be explained below.

Assume that optical signal A originating from a given sub-station is located at a wavelength position separated $\Delta\lambda$ from optical signal B originating from another sub-station, as shown in FIG. 1A. When these optical signals are simultaneously received by a single receiver, beat noise due to optical signals A and B is produced at a higher frequency position, $\Delta\lambda$, than the information signal band, as shown in FIG. 1B.

At this time, if the wavelengths of optical signals A and B are sufficiently separated from each other, i.e., if $\Delta\lambda$ is small, beat noise falls within the information signal band, i.e., beat noise is produced within the information signal band, thus deteriorating reception sensitivity. In the worst case, these signals cannot be received at all.

Hence, in order to suppress beat noise, a wavelength multiplex technique that assures a given wavelength spacing between sub-stations is required.

Note that in the required wavelength multiplex technique, wavelengths need not be assigned at high density and their spacing need only be controlled to prevent beat noise from falling within the signal band, unlike in a technique used for a trunk system for long-distance transmission.

However, since the wavelengths may change due to changes in atmospheric temperature, and beat noise may influence the information signal, a means for detecting beat noise and means for controlling the wavelengths are required. Furthermore, which of a plurality of sub-stations has caused beat noise must be specified.

As the above-mentioned wavelength multiplex transmission system, for example, Jpn. Pat. Appln. KOKAI Publication No. 9-83434 proposed a system in which a main station comprises a beat noise detector. This invention has an arrangement shown in FIG. 2, and the main station has a beat detector. More specifically, referring to FIG. 2, reference numeral 1 denotes a main station; 2-1, 2-2, 2-n, . . . , sub-stations; 3a, an optical fiber for transmitting an upstream optical signal; and 3b, an optical fiber for transmitting a downstream optical signal. The optical fiber 3a for transmitting an upstream optical signal forms a transmission path from the sub-stations 2-1, 2-2, 2-n, . . . toward the main station 1, and the optical fiber 3b for transmitting a downstream optical signal forms a transmission path from the main station 1 toward the 2-1, 2-2, 2-n, . . . .

Reference numeral 4 denotes an E/O (electro-optical) converter for a sub-station; 6, a branch optical fiber; 7, a photocoupler; 8, a sub-station controller; 9, a sub-station modulator; 10, an O/E (opto-electric) converter for a sub-station; and 11, a sub-station demodulator. Each of the sub-stations 2-1, 2-2, 2-n, . . . incorporates these devices.

Each of the sub-stations 2-1, 2-2, 2-n, . . . is connected to the optical fiber 3a for transmitting an upstream optical signal by its E/O converter 4 via the branch optical fiber 6. A plurality of photocouplers 7 are connected to the optical fiber 3a. When the distal ends of the branch optical fibers 6 are connected to these photocouplers 7, they are optically connected to each other.

Also, another plurality of photocouplers 7 are connected to the optical fiber 3b. When the distal ends of other branch optical fibers 6 connected to the O/E converters 10 are connected to these photocouplers 7, the optical fiber 3b and sub-stations 2-1, 2-2, 2-n, . . . are optically connected to each other.

Hence, each sub-station branches information optically transmitted from the main station 1 by the photocoupler 7 and inputs the information to the O/E converter 10. The O/E converter 10 photoelectrically converts the information into an electric signal. The electric signal is demodulated by the sub-station demodulator 11. Control information contained in the demodulated information is supplied to the E/O converter 4 via the sub-station controller 8 to control electrooptical conversion. On the other hand, information transmitted from the sub-station is modulated by the sub-station modulator 9, and the modulated information is converted by the E/O converter 4 into an optical signal. The optical signal is sent onto the optical fiber 3a via the branch optical fiber and photocoupler 7.

Furthermore, in FIG. 2, reference numeral 12 denotes a main station controller; 13, a main station modulator; 14, a main station E/O converter; 15, a main station O/E converter; 16, a main station demodulator; and 17, a beat detector, which construct the main station 1. In the main station 1, an optical signal transmitted via the optical fiber 3a is received by the O/E converter 15, and an electric signal obtained by photoelectric conversion is supplied to the beat detector 17 and main station demodulator 16. The electric signal is demodulated by the main station demodulator 16, and the demodulated signal is output. The beat detector 17 detects beat noise from the electric signal output from the O/E converter 15 after photoelectric conversion.

The main station controller 12 modulates a transmission signal using the main station modulator 13 while controlling the modulator 13 in accordance with the detection output from the beat detector 17. The modulated signal is converted by the E/O converter from an electric signal into an optical signal. The optical signal is then output onto the optical fiber 3b.

The beat detector 17 provided to the main station 1 detects beat noise. In the main station 1, the beat detector 17 detects beat noise produced when the wavelength spacing between certain sub-stations becomes small, by monitoring the power of beat noise.

Upon detection of the beat noise, in the main station 1, a control means (not shown) supplies a wavelength change command to the sub-stations 2-1, 2-2, 2-n, ... in turn to temporarily change the wavelengths of the sub-stations 2-1, 2-2, 2-n, ... in turn, and to specify source sub-stations that have produced beat noise therebetween by comparison with the power of the beat noise. Then, the control means supplies a wavelength control instruction to the specified sub-station to manage its wavelength.

As described above, in the conventional wavelength multiplex transmission system, the following method has been proposed as a measure against beat noise. That is, the beat detector checks whether or not beat noise has been produced by monitoring noise power in the beat noise band in the photoelectrically converted reception signal. If the detector determines that beat noise has been produced, the wavelengths of the sub-stations are changed in turn, and changes in beat noise are compared with those in wavelength to specify the sub-station that has caused the beat noise.

However, this method suffers the following problems since a wavelength change command is supplied to substations in turn to change their wavelengths:

[i] If the number of sub-stations is large, a long time is required for selecting each sub-station since a wavelength change instruction must be repetitively issued to the sub-stations.

[ii] This wavelength change instruction may produce another beat noise between sub-stations that have otherwise kept an appropriate wavelength spacing.

[iii] The wavelength control algorithm is complicated.

Therefore, development of a technique that can specify a sub-station that is a beat noise source from a plurality of sub-stations without influencing the sub-stations at normal wavelength positions is in strong demand.

It is therefore an object of the present invention to provide an optical communication system comprising a beat noise detector which allows a main station alone to specify a sub-station that is a beat noise source without issuing any wavelength change instruction to sub-stations.

According to the present invention, the wavelengths of sub-stations at normal wavelength positions need not be controlled, and the wavelength of only a sub-station that has caused beat noise is controlled to suppress beat noise. Hence, wavelength control between the main station and sub-stations can be quickly done by a simple algorithm.

BRIEF SUMMARY OF THE INVENTION

In order to achieve the object, according to the first aspect of the present invention, there is provided an optical communication system comprising:

a plurality of sub-stations; and
a main station connected to the plurality of sub-stations via an optical transmission path,
wherein the plurality of sub-stations respectively comprise modulation means for modulating a wavelength of an optical signal containing information signals, by using a control signal having a unique frequency allocated to the sub-station, which is transmitted from the respective sub-station to the main station via the optical transmission path, arbitrary pairs of control signals having different frequency differences, and
the main station comprises:
extraction means for extracting a beat noise component from the optical signals modulated by the modulation means; and
determination means for determining two sub-stations that have produced beat noise on the basis of frequency difference of an arbitrary pair of control signals contained in the beat noise component extracted by the extraction means.

According to the second aspect of the present invention, there is provided an optical communication system of the first aspect, wherein the modulation means directly modulates a semiconductor laser diode in intensity by using the information signals and control signal.

According to the third aspect of the present invention, there is provided an optical communication system of the first aspect, wherein the modulation means comprises:
generation means for generating a first optical signal by directly modulating a semiconductor laser diode by using the control signal; and
an external optical modulator for modulating the first optical signal by using the information signal so as to obtain the optical signal modulated by the modulation means.

According to the fourth aspect of the present invention, there is provided an optical communication system of the first aspect, wherein when the number of the plurality of sub-stations is L (L is an integer not less than 3), fm1 to fmL respectively represent frequencies of the control signals of the optical signals of the L sub-stations, and two frequency differences between arbitrary pairs of the control signals are respectively given by:

$$\Delta fm = |fmM - fmN|, \Delta fm' = |fmO - fmP|$$

(M≠N, O≠P, M≠O, 1≦M, N, O, P≦L, and M, N, O, and P are integers)
the two frequency differences satisfy:

$$\Delta fm \neq Q \times \Delta fm'$$

(Q is an integer) and,
a maximum modulation frequency of information signals S to be transmitted from the sub-stations 1 to L to the main station,
modulation signals fs1 to fsL falling within different frequency bands in the sub-stations 1 to L,
a frequency difference between an arbitrary pair of the modulation signals fs1 to fsL, and
the frequencies fm1 to fmL and the frequency difference Δfm satisfy:
maximum modulation frequency of information signal S<Δfm<fm1 to fmL, Δfs, fs1 to fsL According to the fifth aspect of the present invention, there is provided an optical communication system of the first aspect, wherein the determination means comprises:

detection means for detecting the beat noise component extracted by the extraction means;

filter means for respectively extracting frequency difference components of the control signals from the beat noise component detected by the detection means; and specifying means for specifying the two sub-stations that have produced the beat noise on the basis of the frequency difference components extracted by the filter means.

According to the sixth aspect of the present invention, there is provided an optical communication system of the first aspect, wherein the determination means comprises:

detection means for detecting the beat noise component extracted by the extraction means;

formation means for sequentially forming signals having frequencies corresponding to the frequency differences of the control signals of the sub-stations;

correlation means for outputting a signal indicating correlation between the beat noise component detected by the detection means, and the signal formed by the formation means; and specifying means for specifying the two sub-stations that have produced the beat noise on the basis of the signal output from the correlation means.

According to the seventh aspect of the present invention, there is provided an optical communication system comprising:

a plurality of sub-stations; and a main station connected to the plurality of sub-stations via an optical transmission path, wherein the plurality of sub-stations respectively comprise modulation means for directly modulating a semiconductor laser diode in intensity by using information signals, and generating an optical signal which is transmitted from the respective sub-stations to the main station via the optical transmission path, and the main station comprises:

extraction means for extracting a beat noise component from the optical signals modulated by the modulation means;

detection means for detecting the beat noise component extracted by the extraction means;

means for acquiring the information signals of the sub-stations from the optical signals transmitted, and sequentially outputting signals indicating correlation between the beat noise component detected, and the information signals acquired; and specifying means for specifying the two sub-stations that have produced the beat noise on the basis of the signals indicating the correlation sequentially output.

According to the eighth aspect of the present invention, there is provided an optical communication system of the seventh aspect, wherein the information signals are modulated by using a digital signal, and the means for sequentially outputting executes correlation processing within one symbol time of the digital signal.

According to the ninth aspect of the present invention, there is provided an optical communication system of the seventh aspect, further comprising:

phase shift means for shifting phases of the information signals acquired, and sequentially outputting signals indicating correlation between the beat noise component detected, and the information signals shifted, wherein the specifying means specifies the two sub-stations that have produced the beat noise based on the signals indicating correlation between the beat noise component detected, and the information signals shifted.

According to the 10th aspect of the present invention, there is provided an optical communication system of the ninth aspect, wherein the phase shift means shifts 90° the phases of the information signals acquired.

According to the 11th aspect of the present invention, there is provided an optical communication system of the first aspect, wherein the main station further comprises:

means for outputting a wavelength control signal, for changing the wavelength of the optical signal to be transmitted to one of the two determined sub-stations, and the sub-station further comprises:

changing means for changing the wavelength the optical signal to be transmitted to the main station on the basis of the wavelength control signal output.

According to the 12th aspect of the present invention, there is provided an optical communication system of the first aspect, further comprising:

increasing means for increasing power of the optical signal transmitted from a new sub-station connected to the transmission path while detecting beat noise by the determination means;

stop means for stopping the increase in power of the optical signal transmitted from the newly connected sub-station when the determination means detects the beat noise caused by the power of the optical signal transmitted from the newly connected sub-station and increased by the increasing means;

changing means for changing a wavelength of the optical signal transmitted from the newly connected sub-station and a wavelength of the optical signal transmitted from another sub-station when the stop means stops the increase in power of the optical signal transmitted from the newly connected sub-station; and means for increasing the power of the optical signal transmitted from the newly connected sub-station when the changing means has changed the wavelengths of the optical signals transmitted from the newly connected sub-station and the other sub-station.

According to the 13th aspect of the present invention, there is provided a system of the seventh aspect, wherein the main station further comprises:

means for outputting a wavelength control signal, for changing the wavelength of the optical signal to be transmitted to one of the two determined sub-stations, and the sub-station further comprises:

changing means for changing the wavelength the optical signal to be transmitted to the main station on the basis of the wavelength control signal output.

According to the 14th aspect of the present invention, there is provided a system of the seventh aspect, further comprising:

increasing means for increasing power of the optical signal transmitted from a new sub-station connected to the transmission path while detecting beat noise by the determination means;

stop means for stopping the increase in power of the optical signal transmitted from the newly connected sub-station when the determination means detects the beat noise caused by the power of the optical signal transmitted from the newly connected sub-station and increased by the increasing means;

changing means for changing a wavelength of the optical signal transmitted from the newly connected sub-station and a wavelength of the optical signal transmitted from another sub-station when the stop means stops the increase in power of the optical signal transmitted from the newly connected sub-station; and means for increasing the power of the optical signal transmitted from the newly connected sub-station when the changing means has changed the wavelengths of the optical signals transmitted from the newly connected sub-station and the other sub-station.

According to the 15th aspect of the present invention, there is provided a control method for an optical communication system comprising the steps of:

transmitting optical signals containing information signals from a plurality of sub-stations to a main station and control signals unique to the sub-stations via a transmission path, arbitrary pairs of the control signals having different frequency differences;

extracting a beat noise component from the transmitted optical signals; and determining two sub-stations that have produced beat noise on the basis of frequency difference of an arbitrary pair of control signals contained in the extracted beat noise component.

According to the 16th aspect of the present invention, there is provided a control method of the 15th aspect, wherein when the number of the plurality of sub-stations is L (L is an integer not less than 3), fm1 to fmL respectively represent frequencies of the control signals of the optical signals of the L sub-stations, and two frequency differences between arbitrary pairs of the control signals are respectively given by:

$$\Delta fm = |fmM - fmN|, \Delta fm' = |fmO - fmP|$$

($M \neq N$, $O \neq P$, $M \neq O$, $1 \leq M, N, O, P \leq L$, and M, N, O, and P are integers)

the two frequency differences satisfy:

$$\Delta fm \neq Q \times \Delta fm'$$

(Q is an integer) and, a maximum modulation frequency of information signals S to be transmitted from the sub-stations 1 to L to the main station, modulation signals fs1 to fsL falling within different frequency bands in the sub-stations 1 to L, a frequency difference between an arbitrary pair of the modulation signals fs1 to fsL, and the frequencies fm1 to fmL and the frequency difference $\Delta fm$ satisfy:

maximum modulation frequency of information signal $S < \Delta fm < fm1$ to fmL, $\Delta fs$, fs1 to fsL According to the 17th aspect of the present invention, there is provided a control method of the 15th aspect, wherein the step of determining the two sub-stations comprises the steps of:

detecting the extracted beat noise component;

extracting frequency difference components of the control signals from the detected beat noise component by using the filters, respectively; and specifying the two sub-stations that have produced the beat noise on the basis of the extracted frequency difference components.

According to the 18th aspect of the present invention, there is provided a control method of the 15th aspect, wherein the step of determining the two sub-stations comprises the steps of:

detecting the extracted beat noise component;

sequentially forming signals having frequencies corresponding to the frequency differences of the control signals of the sub-stations;

outputting a signal indicating correlation between the detected beat noise component, and the formed signal; and specifying the two sub-stations that have produced the beat noise on the basis of the output signal.

According to the 19th aspect of the present invention, there is provided a control method for an optical communication system comprising the steps of:

transmitting optical signals containing information signals from a plurality of sub-stations to a main station via a transmission path;

extracting a beat noise component from the optical signals transmitted;

acquiring information signals of the sub-stations from the optical signals transmitted;

outputting signals indicating correlation between the beat noise component extracted and information signal acquired; and determining two sub-stations that have produced beat noise based on the signals outputted.

According to the 20th aspect of the present invention, there is provided a control method of the 19th aspect, wherein the step of determining the two sub-stations comprises the steps of:

shifting phases of the information signals acquired; and outputting second signals indicating correlation between the detected beat noise component, and the phase-shifted signals, wherein the step of determining determines the two sub-stations that have produced the beat noise based on the second signals.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 is a graph showing the detection output;

FIG. 10 is a block diagram showing an optical communication system according to the second embodiment of the present invention;

DETAILED DESCRIPTION OF THE INVENTION

Outline of Invention

Figure 1A:
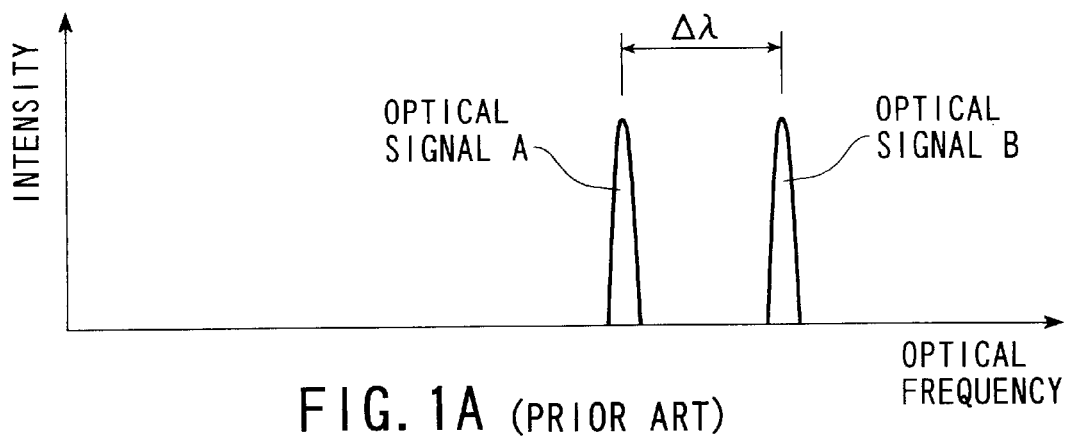
FIG. 1A is a graph for explaining the mechanism of beat noise generation.
Figure 1B:
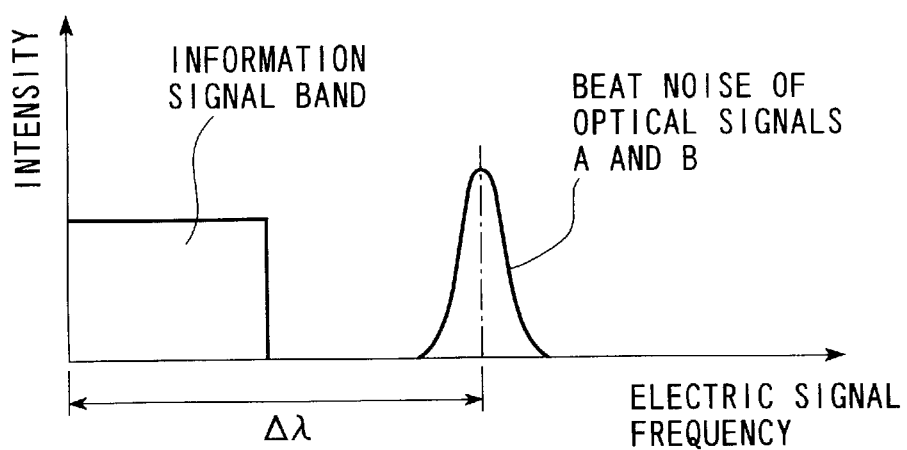
FIG. 1B is a graph for explaining the mechanism of beat noise generation.
Figure 2:
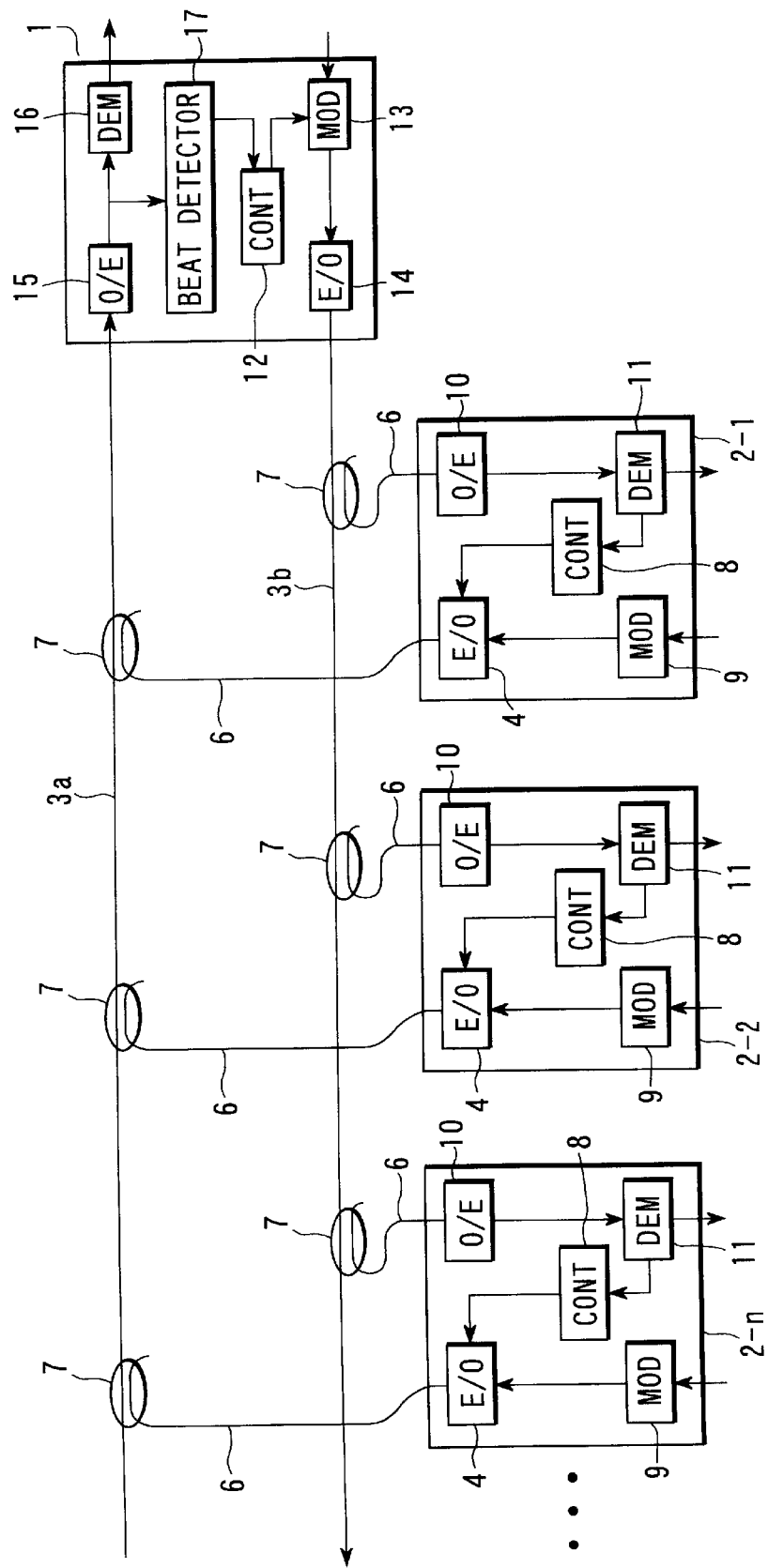
FIG. 2 is a block diagram showing a conventional optical communication system.

[1] An optical communication system according to the first invention is an optical communication system in which light sources of a plurality of sub-stations 1 to L have different wavelengths $\lambda c1$ to $\lambda cL$, optical signals transmitted from the sub-stations are wavelength-multiplexed and transmitted via a common optical transmission path, and the optical signals are simultaneously received by a single receiver in a main station to obtain an electric signal multiplexed in the frequency domain.

The system is characterized in that each wavelength $\lambda c1$ to $\lambda cL$ of the light sources in the sub-stations 1 to L is modulated by the signal having a unique frequency fm allocated to the sub-station, and differences $\Delta fm=|fmM-fmN|$ ($M \neq N$, $1 \leq M \leq L$, $1 \leq N \leq L$, and M and N are integers) between arbitrary pairs of the frequencies fm1 to fmL are different from each other, and the system is characterized by comprising beat noise detection means for detecting a component $\Delta fm$ to specify two sub-stations that have caused beat noise. When optical signals transmitted from the plurality of sub-stations are simultaneously received by the main station, if the wavelengths of arbitrary two sub-stations become close to each other, beat noise between these sub-stations falls within the information signal band and interference takes place, thus deteriorating the transmission characteristics. At this time, which sub-stations have caused beat noise must be quickly specified before the beat noise influences the information signal.

When the frequency differences $\Delta fm$ between pairs of control signals of the plurality of sub-stations are set to be different from each other like in this invention, the value $\Delta fm$ contained in beat noise between the sub-stations need only be measured to quickly specify the sub-stations that have caused beat noise.

[2] In an optical communication system according to the second invention, at each of the sub-stations of the optical communication system of the first invention, each semiconductor laser diode is modulated directly in intensity by the information signal and the control signal to be transmitted from sub-station to the main station. Directly modulating a semiconductor laser diode in intensity by a signal ca achieve that a wavelength of the optical signal generated by the semiconductor laser diode is modulated by the signal. It is because a semiconductor laser diode has the characteristics of wavelength chirp which means that a wavelength changes in correspondent to a drive current to be supplied to the semiconductor laser diode.

According to the second invention, each sub-station does not need a component for modulating a wavelength of an optical signal to be transmitted from that sub-station to the main station. The entire structure of sub-stations can be made compact and simple. Moreover, sub-stations can be build with low cost.

[3] In an optical communication system according to the third invention, each of the sub-stations of the optical communication system of the first invention modulates an information signal to be transmitted from that sub-station to the main station using an external optical modulator. A larger-capacity, high-frequency information signal cannot be obtained by only direct modulation of the light source since the modulation band is limited. Hence, an information signal is modulated by the external optical modulator.

According to the third invention, each sub-station attains wavelength modulation at a frequency fm by changing a drive current to be supplied to the light source, setting temperature, or the like, and the wavelength-modulated optical signal output from the light source is modulated by the external optical modulator on the basis of an information signal, thus superposing the information signal on the optical signal.

A larger-capacity, high-frequency information signal cannot be obtained by only direct modulation of the light source since the modulation band is limited. However, such limitations can be removed by modulating an information signal using the external optical modulator.

In the present invention, a component $\Delta fm$ is detected from such wavelength-modulated signal to specify sub-stations that have caused beat noise. Even the system that modulates an information signal using the external modulator can detect a component $\Delta fm$ and can flexibly cope with the capacity and frequency band of the information signal.

[4] In an optical communication system according to the fourth invention, a combination of arbitrary two frequency differences $\Delta fm=|fmM-fmN|$ and $\Delta fm'=|fmO-fmp|$ ($M \neq N$, $O \neq P$, $M \neq O$, $1 \leq M$, N, O, $P \leq L$) satisfy $\Delta fm \neq Q \times \Delta fm"$ (Q is an integer), and the maximum modulation frequency of an information signal S to be transmitted from one of the sub-stations 1 to L to the main station, modulated signals fs1 to fsL falling within different frequency bands in the sub-stations 1 to L, a frequency difference $\Delta fs$ between arbitrary two out of the modulated signals fs1 to fsL, and fm1 to fmL and $\Delta fm$ satisfy:

maximum modulation frequency of information signal $S<\Delta fm<fm1$ to fmL, $\Delta fs$, fs1 to fsL While beat noise is located in the high-frequency band before it enters the signal band, the sub-stations that have caused beat noise must be specified. In such case, detection may be facilitated by converting the beat noise to a low-frequency component by, e.g., diode detection. However, upon detection, nonlinear factors may be mixed. Hence, beat noise detection can be made accurately by setting the frequencies to prevent the harmonics of $\Delta fm$ from running into other $\Delta fm$ or prevent fm1 to fmL, $\Delta fs$, fs1 to fsL, and the like from running into $\Delta fm$.

[5], [6] An optical communication system according to the fifth and the sixth invention are characterized by comprising a beat noise detector for detecting components $\Delta fm$ to specify two sub-stations that have caused beat noise from the reception output of optical signals, the wavelengths of which are modulated by the control signal at the frequency fm and which are transmitted from the plurality of sub-stations 1 to L. The sub-stations that have caused the beat noise can be detected from the components fm1 to fmL since the components fm1 to fmL have stable spectra irrespective of the format of an information signal from each sub-station.

[7], [8], [9] and [10] An optical communication system according to the seventh to tenth invention are optical communication systems in which light sources of a plurality of sub-stations 1 to L have different wavelengths $\lambda c1$ to $\lambda cL$, optical signals transmitted from the sub-stations are wavelength-multiplexed and transmitted via a common optical transmission path, and the optical signals are simultaneously received by a single receiver in a main station to obtain an electric signal multiplexed in the frequency domain, and is characterized in that the main station comprises beat noise detection means for detecting correlation between information signals received from the sub-stations 1 to L, and beat noise so as to specify two sub-stations that have caused beat noise. Since the beat noise is expressed by the product of optical signals from two specific sub-stations, it contains information signal components of the two specific sub-stations. For this reason, when an information signal within the information signals transmitted from all of the sub-stations is multiplied by the beat noise one by one, two correlative output signals can be obtained if the information signal in which the optical signal causing the beat noise contains is multiplied by the beat noise. From the product of the beat noise and an information signal from the sub-station that does not cause beat noise, since no identical signal is present, a correlation output cannot be obtained. For this reason, according to this embodiment, even when no control signal is inserted into each sub-station, two specific sub-stations contained in the beat noise can be determined.

[8] An optical communication system according to the eighth invention is characterized in that, in the optical communication system of the seventh invention, an information signal is a radio wave signal modulated by a digital signal, the information signals transmitted from the plurality of sub-stations 1 to L to the main stations are contained in modulated signals having different frequencies, and the main station comprises beat noise detection means for determining, from the reception output of optical signals transmitted from the sub-stations 1 to L, two sub-stations that have caused beat noise by sequentially extracting a beat noise component present in the frequency band higher than the information signal band, and the frequency bands of the modulated signals assigned to the sub-stations 1 to L, from the information signal band, and detecting a correlation by multiplying the detected beat noise component and the frequency bands within a time difference containing identical bits of the information signals. As described above, the correlation output can be obtained by multiplying the beat noise and the information signal from the sub-station that has caused the beat noise. However, a correlation output obtained between beat noise that does not contain any bits identical to those of an information signal, and the information signal, may fluctuate depending on the state of the information signal due to different information bits. For this reason, in order to reliably obtain a correlation output, the time difference upon multiplying the beat noise and information signal is set within that contain identical bits. In this way, a stable correlation output can be obtained, and two specific sub-stations contained in beat noise can be specified with high reliability.

[11] In an optical communication system according to the eleventh invention, the main station comprises a beat detector to determine whether or not the wavelengths of the sub-stations is approaching, and beat noise is about to fall within the signal band can be determined, and to control the wavelength allocation of the wavelengths of the sub-stations. When such system is built, the wavelengths of the sub-stations need only be roughly assigned at spacings that can prevent beat noise from falling within the signal band, requirements for wavelength stability among the plurality of sub-stations can be relaxed, and the need for an absolute wavelength reference can be obviated. Hence, the entire system can be made compact, and the range of lasers that can be used can be broadened, thus building a low-cost system.

[12] An optical communication system according to the twelfth invention is characterized by comprising means for, when a new sub-station is connected to the transmission path, increasing optical power of that sub-station stepwise while detecting beat noise by a beat noise detector of the main station, stopping an increase in optical power to control the wavelength of the new sub-station and to also control the wavelengths of other sub-stations as needed upon detection of beat noise, and increasing the optical power stepwise again after the beat noise ceases to be detected. Upon insertion of a new sub-station, the optical communication system is preferably kept in service. For this purpose, when the optical signal power from the new sub-station is immediately increased to a predetermined setting value, if the wavelength of that sub-station is not located at an appropriate position, beat noise is produced, and influences information signals from other sub-stations. The optical signal power from the new sub-station must be increased stepwise in cooperation with the beat noise detector of the main station. With this invention, a new sub-station can be connected with the system in service, and a highly reliable communication system can be provided.

EMBODIMENTS OF INVENTION

In a wavelength multiplex optical transmission system according to the present invention, a main station alone can specify sub-stations that have caused beat noise without issuing any wavelength change instructions and the like to each sub-station. The embodiments of the first to fifth inventions will be described in detail hereinafter with reference to the accompanying drawings.

First Embodiment

In the first embodiment, sub-stations are set to have unique modulation frequencies so that beat noise contains unique frequencies of sub-stations, and upon production of beat noise, a main station can specify sub-stations that have caused the beat noise.

Figure 3:
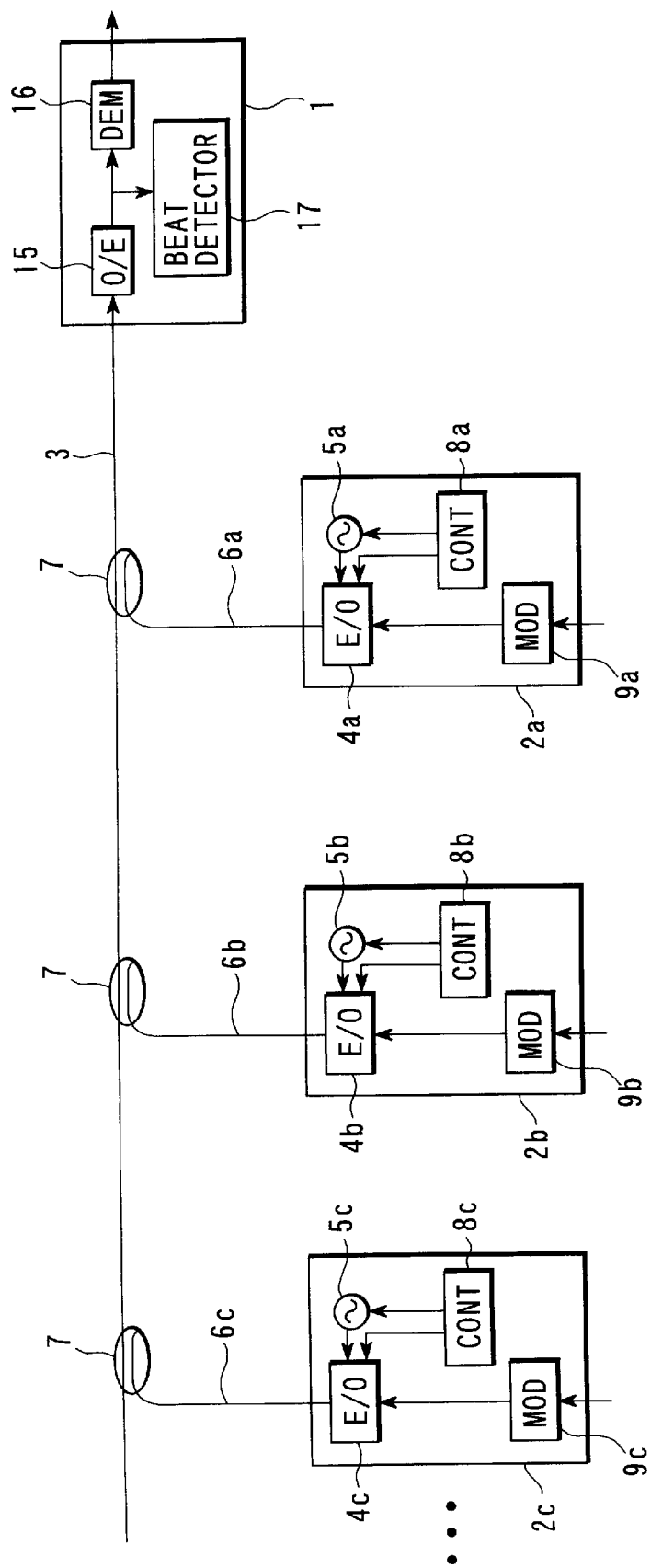
FIG. 3 is a block diagram showing an optical communication system according to the first embodiment of the present invention.

FIG. 3 shows an optical communication system according to the first embodiment of the present invention.

Referring to FIG. 3, reference numeral 1 denotes a main station; 2a, 2b, 2c, . . . sub-stations; and 3, an optical signal transmission optical fiber.

The sub-stations 2a, 2b, 2c, . . . respectively comprise E/O (electro-optical) converters 4a, 4b, 4c, . . . , for the sub-stations, VCOs (voltage controlled oscillators) 5a, 5b, 5c, . . . , branch optical fibers 6a, 6b, 6c, . . . , photocouplers 7, sub-station controllers 8a, 8b, 8c, . . . , and sub-station modulators 9a, 9b, 9c, . . . . The respective E/O (electro-optical) converters 4a, 4b, 4c, . . . includes a semiconductor laser diode for outputting a optical signal to the main-station via the transmission line.

The sub-stations 2a, 2b, 2c, . . . are connected to the optical signal transmission optical fiber 3 via the branch optical fibers 6a, 6b, 6c, . . . by their built-in E/O converters 4a, 4b, 4c, . . . . Each photocoupler 7 is connected to the optical fiber 3, and when the distal end of each branch optical fiber 6 is connected to the photocoupler, they are optically connected to each other.

Note that the system of this embodiment has a downstream optical transmission system in addition to such upstream optical transmission system. However, since the gist of the present invention lies in the upstream system, a detailed description and illustration of the downstream system will be omitted.

More specifically, in this system as well, each sub-station has a function of branching information optically transmitted from the main station 1 via a downstream optical fiber by the photocoupler, fetching the information into an O/E converter via the branch optical fiber, photoelectrically converting the information to obtain an electric signal, and demodulating the electric signal using a sub-station demodulator.

Also in FIG. 3, reference numeral 15 denotes a main station O/E converter; 16, a main station demodulator; and 17, a beat detector, which construct the main station 1. Although not shown, the main station 1 comprises a main station controller, main station modulator, main station E/O converter, and the like as in the conventional system.

In the main station 1, an optical signal transmitted via the optical fiber 3 is received by the O/E converter 15, and an electric signal obtained by photoelectric conversion is supplied to the beat detector 17 of the present invention and the main station demodulator 16, which demodulates the electric signal to be output. The beat detector 17 has a function of extracting beat noise from the electric signal photoelectrically converted by and output from the O/E converter 15, detecting the power of a frequency component contained in the beat noise, and specifying a pair of sub-stations that have caused the beat noise among the sub-stations 2a, 2b, 2c, . . . .

In the system of the present invention, the main station 1 and the plurality of sub-stations 2a, 2b, 2c, . . . are connected via the optical fiber 3 serving as a transmission path. The sub-stations 2a, 2b, 2c, . . . respectively convert upstream information signals to the main station 1 into optical signals using their E/O converters 4a, 4b, 4c, . . . , and transmit the converted optical signals. Also, the sub-stations 2a, 2b, 2c, . . . comprise means for varying the center wavelengths of light rays in the E/O converters 4a, 4b, 4c, . . . .

In this embodiment, as the means for varying the center wavelengths of light rays in the E/O converters 4a, 4b, 4c, . . . , the sub-stations 2a, 2b, 2c, . . . respectively comprise the VCOs (voltage controlled oscillators) 5a, 5b, 5c, . . . which can control oscillation frequencies by voltage, and can generate sine wave signals of desired frequencies. The wavelengths of optical signals transmitted from the sub-stations 2a, 2b, 2c, . . . are periodically changed by sine wave signals having unique frequency components fmk assigned to the individual sub-stations 2k ($1 \leq k \leq n$).

In other words, in the system of the present invention, unique frequencies fma, fmb, fmc, . . . , fmn assigned to the respective sub-stations 2a, 2b, 2c, . . . 2n are set so that frequency differences Δfm=fmk−fmm ($k \neq m$, $1 \leq k \leq n$, $1 \leq m \leq n$) between pairs of sub-stations are different from each other.

For example, if the sub-station 2a is set at fma=10 [MHz], the sub-station 2b is set at fmb=10.5 [MHz], and the sub-station 2c is set at fmc=11.2 [MHz], their frequency differences are:

|fma−fmb|=500 [KHz]

|fmb−fmc|=700 [KHz]

|fmc−fma|=1200 [KHz]

In this way, the frequency differences Δfm between pairs of sub-stations are different in units of combinations.

In the sub-stations 2a, 2b, 2c, . . . , 2n, wavelengths of optical signals transmitted to the main station 1 are modulated by sine wave signals having unique frequencies fm. Some methods of modulating the wavelengths are available. For example, [a] a method of changing the external resonator length by a light source that uses an external resonator, [b] a method of changing the internal refractive index using a DBR laser, [c] a method of changing the drive current value or setting temperature of a laser, and the like are available.

In general, [c] "the method of changing the drive current value of the laser" is used. More specifically, in the sub-stations 2a, 2b, 2c, . . . , 2n, when drive currents obtained by frequency-multiplexing sine wave signals having the frequencies fma, fmb, fmc, . . . , fmn generated by their VCOs 5a, 5b, 5c, . . . , 5n, and information signals fsa, fsb, fsc, . . . , fsn are applied to the E/O (electro-optical) converters 4a, 4b, 4c, . . . , 4n as lasers due to the frequency chirps of the lasers and the wavelengths of optical signals output from the E/O (electro-optical) converters 4a, 4b, 4c, . . . , 4n are optically modulated at frequencies fma, fmb, fmc, . . . , fmn.

For, transmitting information signals and receiving information signals in optical fiber transmission systems, optical signals are modulated in intensity by information signals fs. In this invention, to specify sub-stations causing beat noise at the main station, wavelengths of optical signals are also modulated by control signals having unique frequencies fm. The above mentioned method, which drive currents obtained by frequency-multiplexing fs and fm are applied directly to the lasers, can achieve modulating the intensities and the wavelengths of optical signals, simultaneously.

Figure 4:
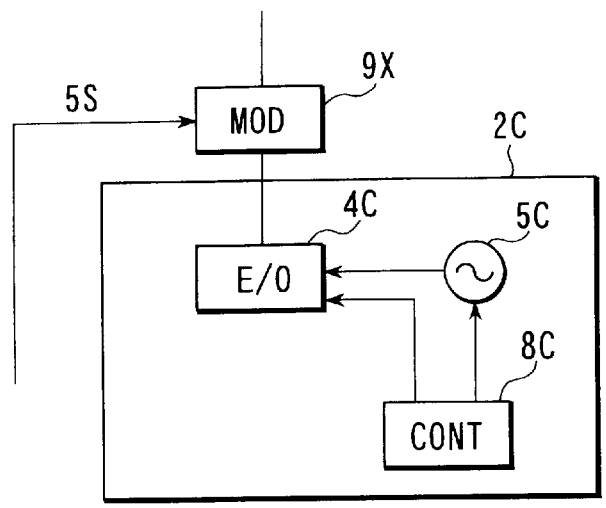
FIG. 4 is a block diagram showing a sub-station which uses an external optical modulator.

When the frequency band of the information signal fs from each of the sub-stations 2a, 2b, 2c, . . . , 2n is too high to be directly modulated by the laser, an external optical modulator 9× may be used, as shown in FIG. 4. In this case, when the wavelength is changed at periods fm by a drive current of a laser, the amplitude of the laser is also modulated. For this reason, upon intensity modulation by the information signal fs in the external optical modulator, fm and fs mix with each other, and the information signal may deteriorate.

To avoid such deterioration, when the external optical modulator is used, a change in drive current of the laser by fm must not be set too large.

As a method of varying the center wavelength of the light source, the above-mentioned method using the wavelength variable light source, a method of changing the DC bias or the like of an application current to the laser, a method of changing the laser temperature using a Peltier element, and the like may be used.

Optical signals transmitted from the sub-stations $2a$, $2b$, $2c$, ..., $2n$ are input to the branch optical fibers 6, are wavelength-multiplexed on the optical fiber 3 via the photocouplers 7, and are then transmitted to the main station 1.

The main station 1 will be explained below.

The main station 1 simultaneously receives wavelength-multiplexed optical signals transmitted from the sub-stations $2a$, $2b$, $2c$, ..., $2n$ via the optical fiber 3 using a single receiver, and converts them into frequency-multiplexed electric signals using the O/E converter 15. The main station 1 then demultiplexes the multiplexed signals into those in the individual modulation frequency bands and demodulates them to acquire information signals from the sub-stations $2a$, $2b$, $2c$, ..., $2n$ using the demodulator 16.

Note that the output signal from the O/E converter 15 is branched into two paths; one signal is input to the above-mentioned demodulator 16 and the other signal is input to the beat detector 17. The beat detector 17 detects beat noise, and specifies sub-stations that have contributed to production of the beat noise. This detection is done as follows.

Figure 5A:
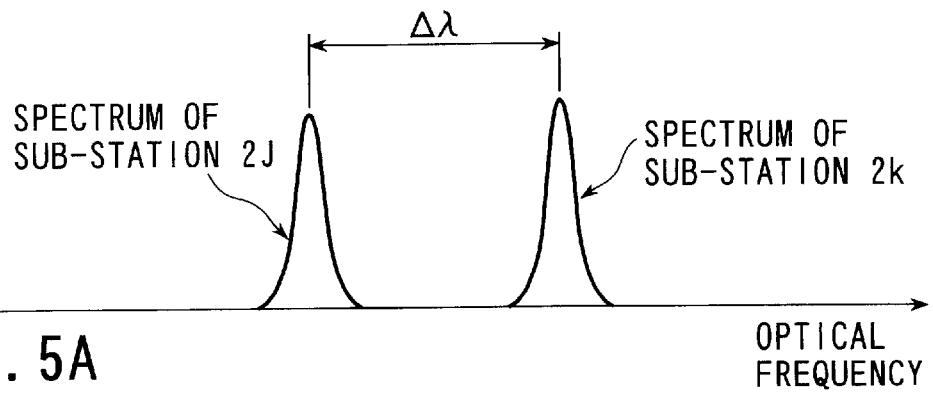
FIG. 5A is a graph showing the frequency spectrum of beat noise.

Assume that beat noise has been produced by optical signals coming from the sub-stations $2j$ and $2k$ as shown in FIG. 5A. In this case, since the wavelengths are wavelength-modulated by the frequencies fmj and fmk, the frequency spectra of beat noise of the sub-stations $2j$ and $2k$ are expressed, as shown in FIG. 5B, assuming that the O/E converter 15 of the main station 1 is an ideal square detection PD (photodetector).

Figure 5B:
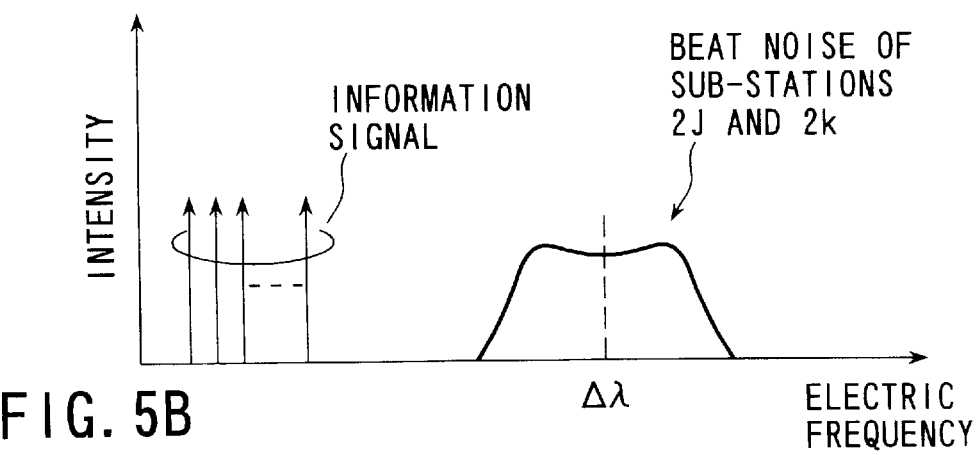
FIG. 5B is a graph showing the frequency spectrum of beat noise.

That is, as shown in FIG. 5B, the beat frequencies extend broadly around the center wavelength difference $\Delta\lambda$ of the sub-stations $2j$ and $2k$.

When the wavelength spacing is maintained large enough, the center frequency of beat noise is in a high-frequency band and does not have any influence on the modulation frequency bands.

However, when the wavelength spacing between the sub-stations $2j$ and $2k$ narrows due to some cause, the beat noise shifts to the lower-frequency band and begins to influence the modulation frequency bands, as shown in FIG. 5B. That is, it is important to detect such downward shift of the production frequency band of the beat noise before the beat noise begins to influence the signal band.

The beat detector 17 with such function will be explained below.

Figure 6:
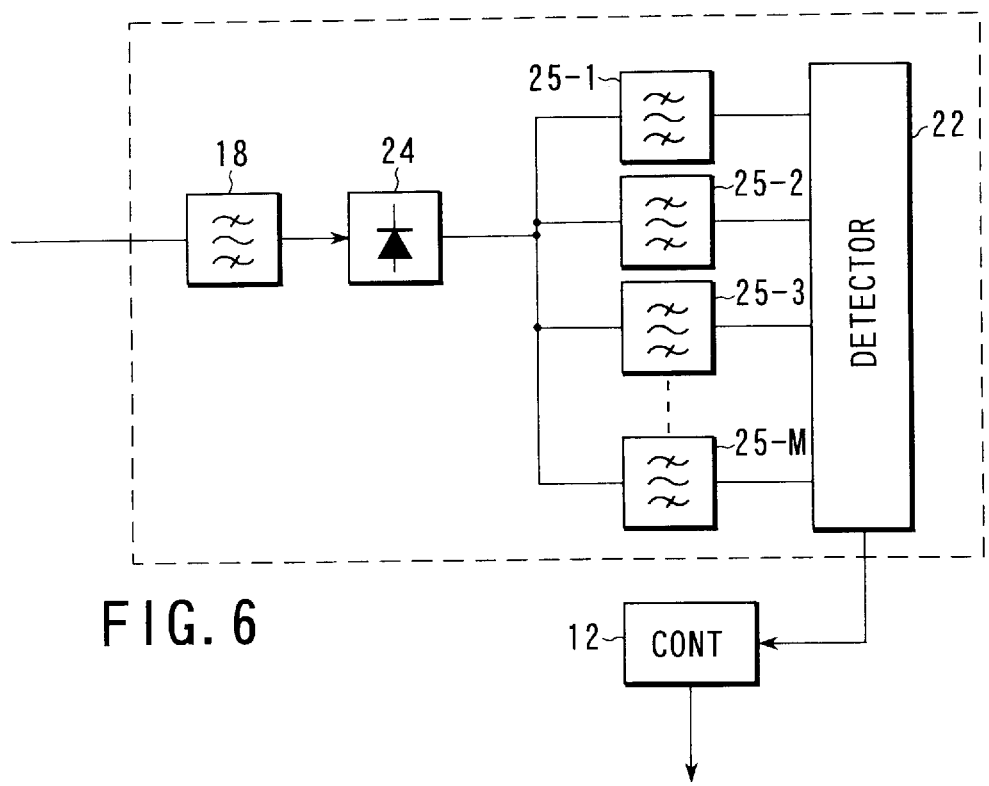
FIG. 6 is a block diagram showing a beat detector according to an embodiment of the present invention.

FIG. 6 shows the beat detector 17. As shown in FIG. 6, the beat detector 17 comprises a bandpass filter 18, diode detector 24, bandpass filters 25-1, 25-2, 25-3, ..., 25-M, and power detector 22.

Figure 7:
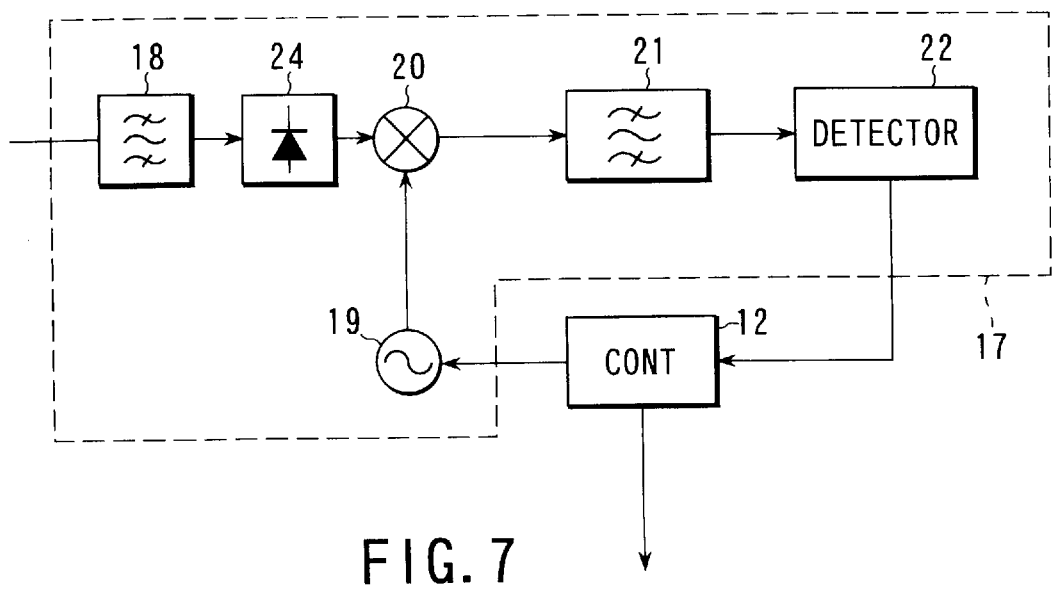
FIG. 7 is a block diagram showing a beat detector according to another embodiment of the present invention.

FIG. 7 shows another embodiment of the beat detector 17.

As shown in FIG. 7, the beat detector comprises a bandpass filter 18, VOC 19, diode detector 24, low-pass filter 21, and power detector 22.

Figure 8A:
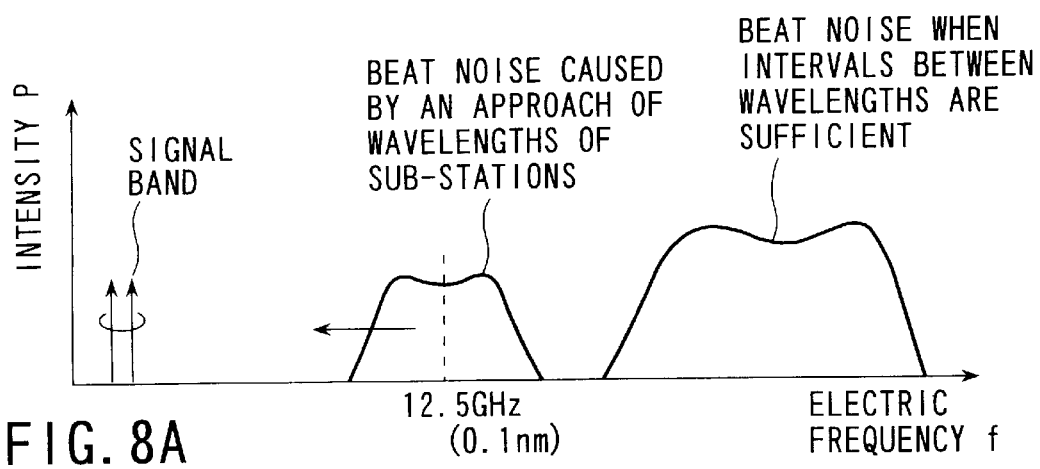
FIG. 8A is a graph showing the spectrums of the signal band and beat noise.

As shown in FIGS. 6 and 7, the beat detector 17 extracts beat noise components within a band higher than the modulation signal frequencies from the reception signal branched from the O/E converter 15 using the filter 18. The filter 18 can efficiently extract frequency changes of fm and $\Delta$fm as power changes by making one end of the beat noise spectrum fall in a pass-band zone. For example, when the wavelengths of given sub-stations $2j$ and $2k$ approach each other from the state wherein the wavelengths of the sub-stations $2a$, $2b$, $2c$, ..., $2n$ maintain sufficient spacings, and $\Delta\lambda$ becomes 0.1 mm (12.5 GHz), beat noise between these sub-stations $2j$ and $2k$ comes closer to the signal band side, as shown in FIG. 8A.

Figure 8B:
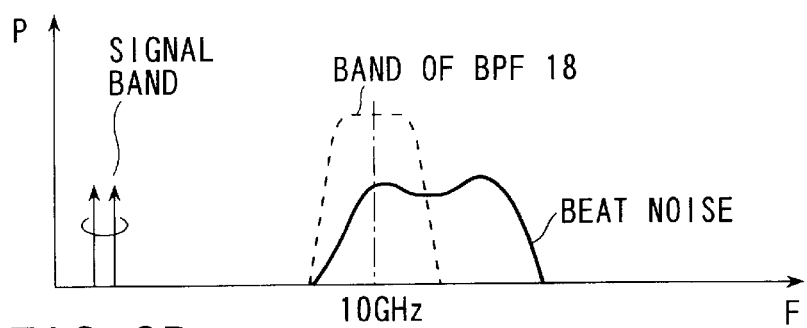
FIG. 8B is a graph showing the filter characteristics of a beat noise detector.

Therefore, as shown in FIG. 8B, by passing the reception signal through the bandpass filter 18 which has a center pass frequency of 10 GHz and a pass bandwidth around 2 GHz, beat noise components that have come close to the signal band can be extracted.

Figure 8C:
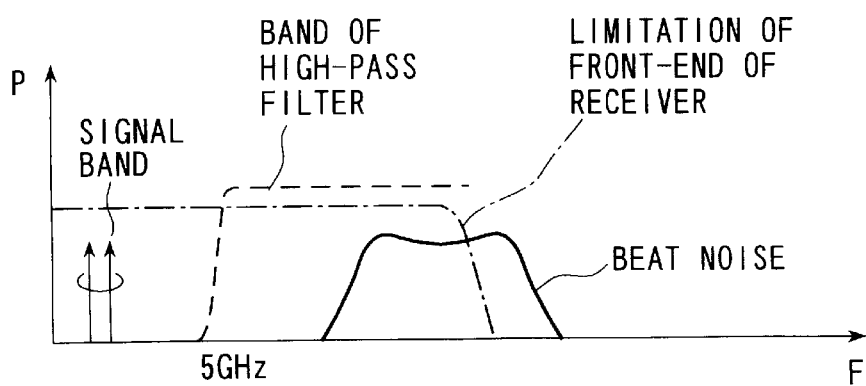
FIG. 8C is a graph showing the filter characteristics of a beat noise detector.

Normally, since the frequency band of a front-end amplifier of the receiver has an upper limit, the filter 18 may use a high-pass filter having a cut-off frequency of 5 GHz to extract beat noise, as shown in FIG. 8C.

At this time, the high-frequency side pass band of beat noise is determined by the front-end frequency band of the receiver, but the entire beat noise spectrum may be passed. In this case, envelope detection by the diode 24 can hardly extract frequency fluctuation components of beat noise, and optical signals from the sub-stations $2a$, $2b$, $2c$, ..., $2n$ must be intensity-modulated by control signals fma, fmb, fmc, ..., fmn.

The output information from the filter 18 is subjected to envelope detection by the diode detector 24. The spectrum of the output signal (electric signal) after envelope detection is expressed, as shown in FIG. 9. Note that in the spectral diagram, information signals from the sub-stations $2j$ and $2k$ that have caused beat noise fall to DC level.

In addition, $\Delta$fm as the frequency difference between the control signals fmj and fmk, fmj, fmk, fsj, fsk, $\Delta$fs, and the like appear. By detecting these components, the sub-stations $2j$ and $2k$ can be specified as those which have caused beat noise.

It is most efficient if the sub-stations $2j$ and $2k$ can be specified by detecting a single frequency band among those components, and $\Delta$fm can be detected independently from the presence/absence of signals.

Note that there are some requirements for the frequency allocation of $\Delta$fm. Since harmonics of these frequency components may be produced depending on the detection diode 24 used, the frequency band of $\Delta$fm is preferably set to be lower. Since the information signal components fall to DC (direct current range), their influences must also be avoided.

Therefore, as shown in FIG. 9, it is preferable to satisfy:

Information signal band<$\Delta$fm<fmj, fmk, $\Delta$fs, fsj, fsk

Depending on the diode detection method, information signal components may be superimposed on $\Delta$fm, but a detection method that can check the presence/absence of the component $\Delta$fm can be used.

Some methods of extracting information $\Delta$fm from the output signal after envelope detection are available. For example, as shown in FIG. 6, the output signal from the diode detector 24 may be branched to the bandpass filters 25 -1, 25-2, ..., 24-M having center frequencies of corresponding $\Delta$fm, and the inputs to these bandpass filters 25-1, ..., 25-M are monitored by the power detector to determine the frequency $\Delta$fm band corresponding to the large output.

Alternatively, as shown in FIG. 7, the outputs from the filter 18 and VOC 19 are multiplied by a mixer 20, the bandpass filter 21 extracts a specific frequency component, and the monitoring result of the power detector 22 is input to the main station controller 12. The oscillation frequency of the VOC 19 is changed in turn by a predetermined frequency offset value from the control frequency differences Δfm of the sub-stations 2a, 2b, 2c, . . . , 2n in accordance with an instruction from the main station controller 12.

The main station controller 12 compares Δfm and the power detection level to find out a Δfm component the power level of which has risen. Since Δfm between arbitrary pairs of the sub-stations 2a, 2b, 2c, . . . , 2n are set to be different from each other, the main station controller 12 can specify the two sub-stations 2j and 2k that have caused beat noise from Δfm, the power of which has risen.

In diode detection, harmonics of Δfm are highly likely to be produced due to the nonlinear characteristics of the diode. For this reason, in order to accurately specify sub-stations that brought about production of beat noise, Δfm preferably satisfies:

$$\Delta fm \neq Q \times \Delta fm'$$

(Q is an integer, Δfm' is Δfm by sub-stations other than sub-stations 2j and 2k)

Upon detecting fmj and fmk of the diode detection outputs, intermodulation distortion between fmk and fmj may appear due to the nonlinearity of diode detection.

In order to accurately detect fm of each sub-station, the frequency allocation that can prevent third order intermodulation distortion that has a large influence in terms of power is preferably exploited as the relationship among the control signals fm of the respective sub-stations. In case of, e.g., five sub-stations 2a, 2b, 2c, 2d, and 2e, such frequency allocation can be set to assure sufficiently large frequency differences:

fma=10.1 [MHz], fmb=10.2 [MHz], fmc=10.5 [MHz], fmd=11.0 [MHz], fme=11.2 [MHz]

As described above, in this embodiment, the sub-stations periodically change their wavelengths using the control signals fm to periodically modulate the wavelengths, and have unique modulation frequencies so that the frequency bands of beat noise between arbitrary pairs of sub-stations can be uniquely specified. Upon production of beat noise, the main station can specify sub-stations that have caused the beat noise by detecting the frequency of the beat noise. In this way, the presence/absence of beat noise that influences the signal band can be reliably detected by the main station alone.

Second Embodiment

This embodiment is different from the first embodiment in that the need for periodically changing the wavelengths of the respective sub-stations by the control signals fm can be obviated.

In order to periodically modulate the wavelength, the control signal is superposed on the drive current of a laser. In such scheme, the modulation factor of the laser is partially accounted for by the control signal. For this reason, when the need for periodic modulation of the wavelength can be obviated, the modulation factor of the laser is not used for the control signal and can be fully assigned to an information signal.

FIG. 10 shows an optical communication system according to the second embodiment of the present invention. FIG. 10 shows the arrangement which is substantially the same as that shown in FIG. 3 except that the VCOs 5a, 5b, 5c, . . . , 5n are excluded.

In the arrangement shown in FIG. 10, a main station 1 simultaneously receives wavelength-multiplexed optical signals transmitted from sub-stations 2a, 2b, 2c, . . . , 2n via an optical fiber 3 using a single receiver, obtains frequency-multiplexed electric signals using an O/E converter 15, and demultiplexes and demodulates them into signals in predetermined modulation frequency bands using a demodulator 16. In order to obtain the signals from all the sub-stations 2a, 2b, 2c, . . . , 2n, the signals are demodulated after they are demultiplexed using filters in units of sub-stations 2a, 2b, 2c, . . . , 2n.

A beat detector 17 in the main station 1 receives a signal obtained by branching the output signal from the O/E converter 16, and signals demultiplexed into those in the respective modulation frequency bands from the demodulator 16.

Figure 11:
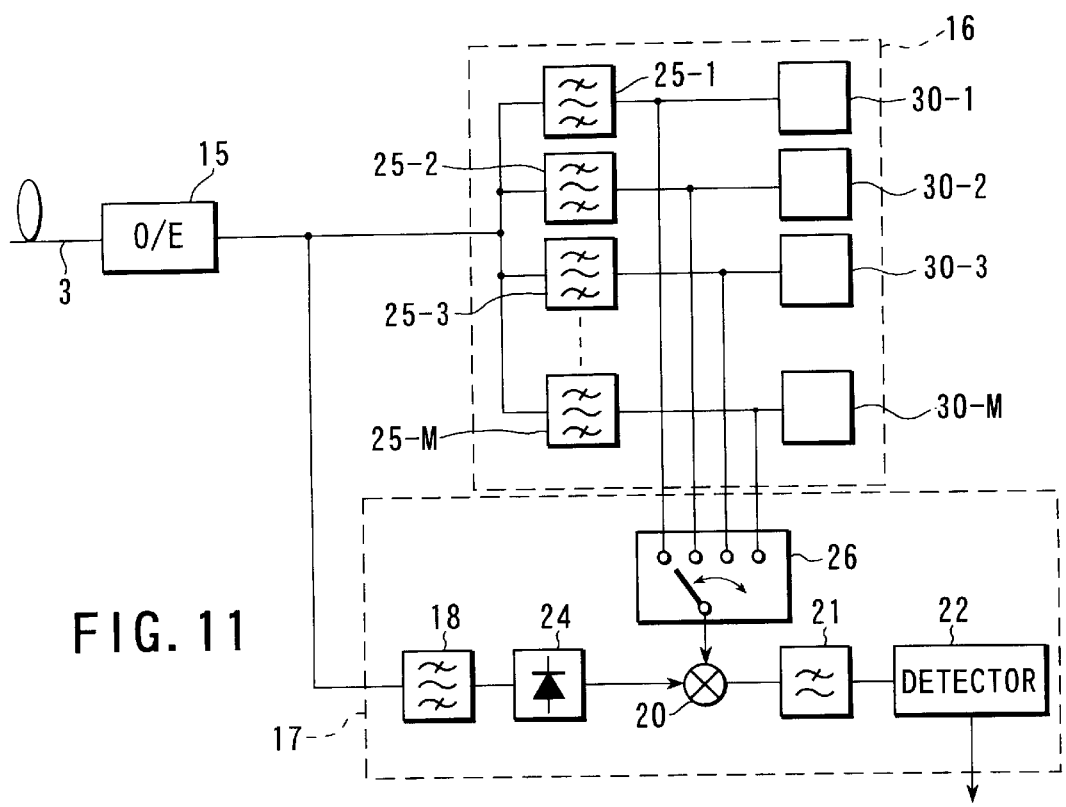
FIG. 11 is a block diagram showing a beat detector used in the optical communication system of the second embodiment.

FIG. 11 shows the arrangement of the demodulator 16 and beat detector 17 in the system of the second embodiment. In the arrangement shown in FIG. 11, the output signal branched from the O/E converter 15 as an opto-electric converter is passed through a bandpass filter 18 to extract beat noise components, which are subjected to envelope detection by a diode 24.

In the beat detector 17, signals in the signal frequency bands assigned to the individual sub-stations 2 and output from the demodulator 15 are switched in turn by a switch 26. Then, correlation between the signal output from the switch 26 and the signal from the diode 24 is examined. For example, the two signals are multiplied by a mixer 20, the product is passed through a low-pass filter 21 for passing DC components, and its power is then measured by a detector 22.

If an information signal fm from a sub-station that has produced beat noise is multiplied by beat noise, since they contain identical signal components, a specific correlation output can be obtained. By minimizing the delay difference between the two signals to be multiplied, a more stable correlation output can be obtained.

If an information signal fm from a sub-station that has not contributed to beat noise is multiplied by beat noise, since they do not contain identical signal components, the correlation value is low; theoretically, zero correlation output is obtained.

A condition for the delay difference between the two signals to be multiplied changes depending on the types of information signals to be transmitted from the sub-stations 2a, 2b, 2c, . . . , 2n to the main station 1. For example, when an analog signal which has been modulated by a digital signal such as π/4QPSK or the like is transmitted, the delay difference between the two signals to be correlated need only fall within one symbol time.

Note that the correlation output obtained from the signals which do not contain an identical symbol fluctuate depending on the bit sequence of an information signal. However, if the two signals contain an identical symbol, a stable correlation output can be obtained independently of the signal sequence and highly reliable beat noise detection can be accomplished. However, if the two signals are multiplied while they have a 90° phase difference with respect to the frequency of the carrier of the information signal, zero correlation value is undesirably obtained.

This problem can be solved by, e.g., phase lock. As a solution that does not require any phase lock, for example, an arrangement shown in FIG. 12 may be used.

Figure 12:
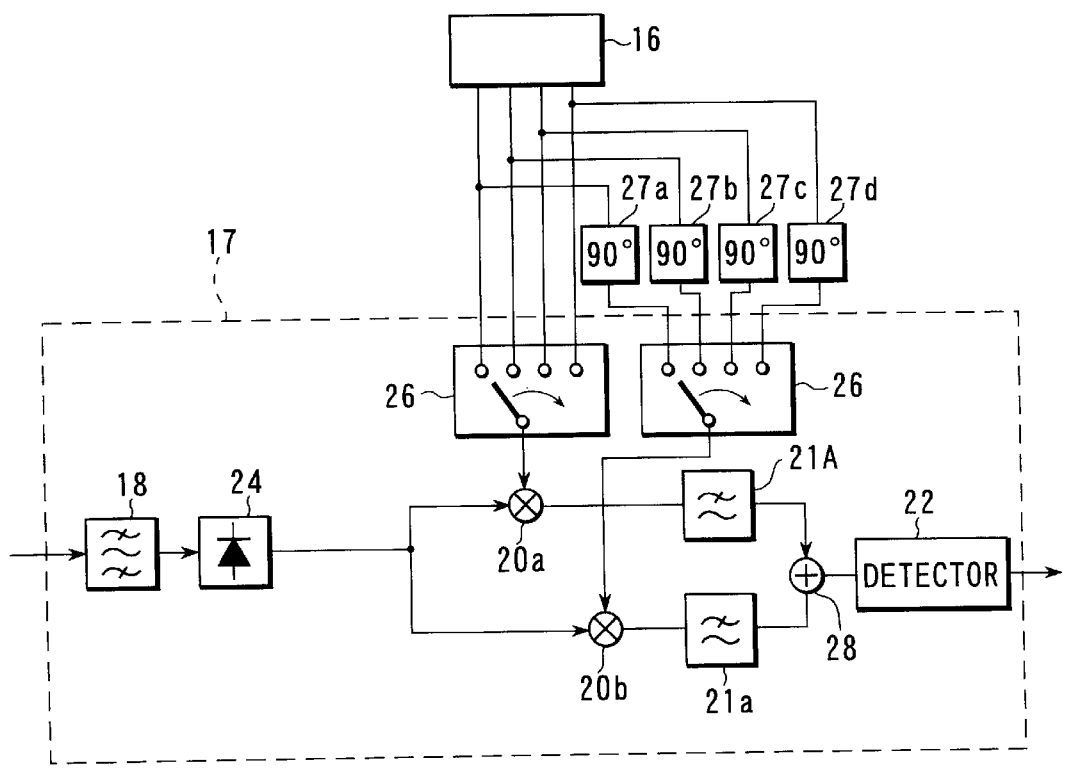
FIG. 12 is a block diagram showing a modification of the beat detector used in the optical communication system of the second embodiment.

The arrangement shown in FIG. 12 will be explained below. Referring to FIG. 12, reference numeral 16 denotes a demodulator; 18, a bandpass filter; 20a and 20b, mixers; 21a and 21b, low-pass filters; 22, a detector; 24, a diode detector; 26a and 26b, switches; 27a, 27b, 27c, and 27d, phase shifters; and 28, an adder.

In this arrangement, information signals output from the demodulator 16 are branched into two paths. The phases of the signals on one path are shifted 90° from that of the carrier by the phase shifters 27a to 27d, and these phase-shifted signals and those on the other path are respectively selected by the switches 26a and 26b.

The two selected signals that have been 90° phase-shifted are respectively multiplied by a signal after detection by the diode 24 by the mixers 20a and 20b, and the products are added to each other by the adder 28 after they pass through the low-pass filters 21a and 21b.

With this method, a correlation output with a given value can be obtained independently of the phase of the carrier.

The characteristic feature of the second embodiment mentioned above is to obviate the need for superposing a control signal on the output from each sub-station to specify sub-stations that produced beat noise. For this reason, the modulation factor to be assigned to the control signal can be assigned to that of an information signal, and the transmission efficiency of the information signal can be improved.

(Wavelength Control Method 1)

Figure 13:
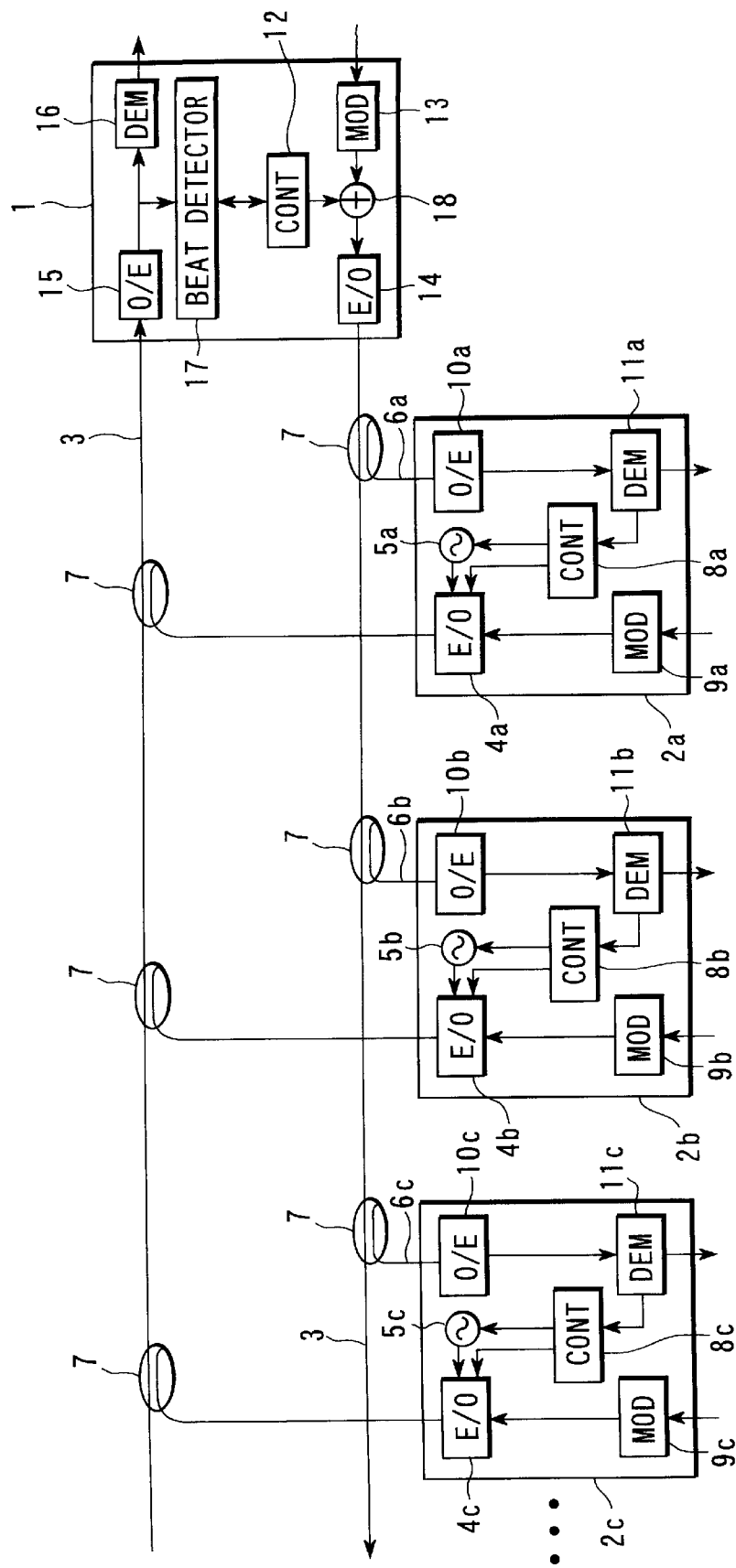
FIG. 13 is a block diagram showing an optical communication system according to the third embodiment of the present invention.

FIG. 13 shows an optical communication system.

A main station 1 and a plurality of sub-stations 2a, 2b, 2c, ..., 2n are connected via optical fibers 3 as transmission paths for upstream signals from the sub-stations 2a, 2b, 2c, ..., 2n to the main station 1, and downstream signals from the main station to the sub-stations. Each of the sub-stations 2a, 2b, 2c, ..., 2n receives a downstream optical signal superposed with a sub-carrier by its O/E converter 10, and extracts a frequency band assigned thereto by a BPF, synch detector, or the like to obtain an information signal addressed to the own station.

The transmission signal from the main station 1 contains wavelength control signals for the sub-stations 2a, 2b, 2c, ..., 2n. In each of the sub-stations 2a, 2b, 2c, ..., 2n, this wavelength control signal is extracted from the reception signal from the O/E converter 10, and is input to a sub-station controller 8. As the transmission method of the wavelength control signals, for example, frequency bands dedicated to control signals are used, and each frequency band is extracted by a bandpass filter.

An upstream signal from each of the sub-stations 2a, 2b, 2c, ..., 2n to the main station 1 is obtained by modulating an optical signal by an information signal using an E/O converter 4, and the modulated optical signal is transmitted.

At this time, the wavelength of the optical signal to be transmitted is periodically changed based on a sine wave signal having a control frequency fmp assigned by the wavelength (sub-station) controller 8 that has received the control signal from the main station 1. In each of the sub-stations 2a, 2b, 2c, ..., 2n, the wavelength controller 8 varies the center wavelength of a light source in the E/O converter 4 in accordance with the wavelength control signal from the main station 1. The optical signal transmitted from each sub-station 2 is input to a branch optical fiber 7, and is wavelength-multiplexed on the optical fiber 3 via a photo-coupler 7. Then, the optical signal is transmitted to the main station 1.

In the main station 1, an information signal addressed to each sub-station is modulated by a modulator 13, and the modulated signal is converted by an E/O converter 14 into an optical signal of a predetermined wavelength. Then, the main station 1 transmits the optical signal onto the optical transmission path 3. The main station 1 simultaneously receives wavelength-multiplexed optical signals transmitted from the sub-stations 2a, 2b, 2c, ..., 2n via the optical transmission path using a single receiver in an O/E converter 15, and demultiplexes and demodulates the multiplexed signals into signals in the respective modulation signal bands using a demodulator 16.

The output signal from the O/E converter 15 is branched into two paths; one signal is input to the demodulator 16 and the other signal is input to a beat detector 17. The beat detector 17 detects the presence/absence of beat noise.

Upon detection of beat noise, sub-stations 2j and 2k that have produced beat noise are specified, and wavelength control signals are sent to the specified sub-stations 2j and 2k after being multiplexed or superposed on information signals to the sub-stations 2a, 2b, 2c, ..., 2n to attain wavelength control, thus suppressing beat noise.

Figure 14:
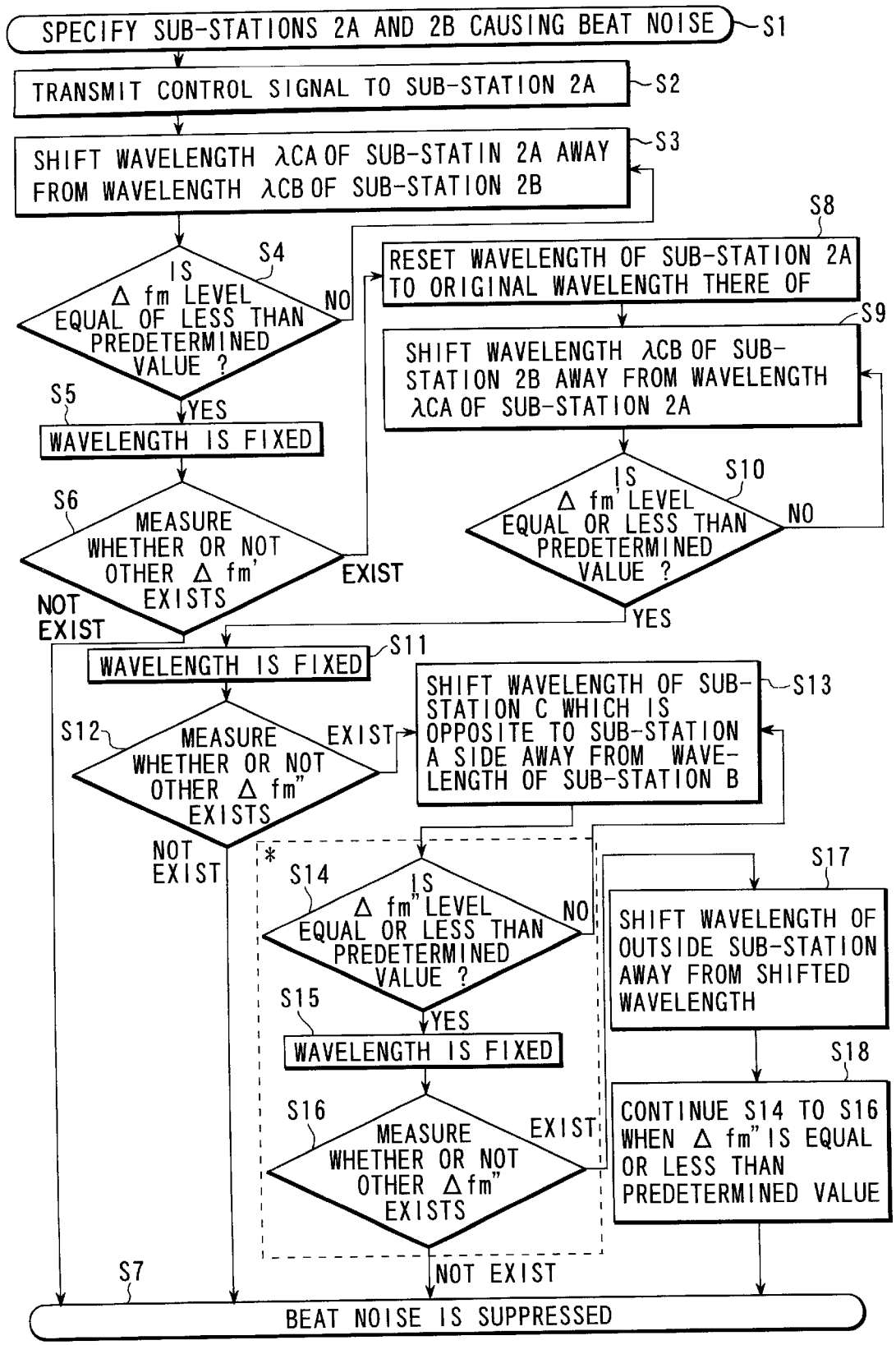
FIG. 14 is a flow chart showing the method of controlling the wavelengths of sub-stations.

FIG. 14 is a flow chart for explaining the wavelength control method.

The wavelength control method will be explained below with the aid of this flow chart. Upon detection of an increase in beat noise, two sub-stations 2A and 2B that have caused beat noise are specified (S1).

Then, one sub-station 2A is selected, and a control signal for shifting a wavelength λcA away from a wavelength λcB of the sub-station 2B is sent from the main station 1 to the sub-station 2A via the downstream path (S2).

The sub-station 2A shifts kcA in accordance with the wavelength shift control signal received from the main station 1 (S3).

The controller 12 in the main controller 1 shifts the wavelength λcA until the power level of the frequency difference Δfm equals a sufficiently small value, which is equal to or larger than a setting value (S4). If the power level of the frequency difference Δfm is equal to or smaller than the setting value, the wavelengths of the sub-stations 2A and 2B are fixed (S5). Then, the controller 12 measures if the power level of the frequency difference Δfm' other than that between the sub-stations 2A and 2B has risen (S6).

As a result if the power of Δfm' has not risen, it is determined that beat noise has been suppressed, thus ending the wavelength control (S7).

However, if it is detected that another frequency difference Δfm' has risen, it is determined that the sub-station 2B is to be subjected to wavelength control.

The wavelength λcA of the sub-station 2A is reset to the wavelength value before control (S8), the optical wavelength λcB of the sub-station 2B is shifted away from the wavelength λcA of the sub-station 2A. Similarly, the wavelength λcB is shifted until the power level of Δfm' becomes equal to or smaller than a setting value (S9, S10). If the power level becomes equal to or smaller than the setting value, the wavelength is fixed (S11).

Upon shifting the wavelength in steps S9 and S10, if a power rise of still another frequency difference Δfm appears (S12), this means that the wavelengths λc of a plurality of sub-stations 2 have been shifted. In this case, a wavelength λcC of a sub-station 2C located outside the wavelengths λcA and λcB of the sub-stations 2A and 2B is shifted until the power level of Δfm' of beat noise becomes sufficiently small (S13). If the power level becomes equal to or smaller than the setting value (S14), the wavelength is fixed (S15).

If new Δfm" is detected (S16) in the processing in steps S14 to S16, the outer sub-station wavelength is shifted in turn, and this process is repeated until all Δfm are removed (S17, S18).

In this manner, the wavelength control is done to suppress beat noise. Note that the control algorithm described above is merely an example.

As another example, an example that can assure a broad band of the beat detector 17 of the main station 1, and can detect drift frequency Δfm levels in the normal wavelength state of the sub-stations 2 will be explained below.

For example, assume that the wavelength of a certain sub-station 2 has changed, and beat noise has been produced. In this case, a frequency Δfm at which the power level rises, and a frequency Δfm' at which the power level drops, are present. If both Δfm can be detected, the sub-station, the wavelength of which has changed, and whether the wavelength has risen or dropped can be specified. Exploiting this fact, the optical wavelength control from the main station 1 can be implemented by a simple algorithm.

(Wavelength Control Method 2)

The arrangement of an optical communication system is the same as that shown in FIG. 13. The upstream optical signal wavelengths of sub-stations 2A, 2M, . . . , 2N, 2L ($1 \leq M, N \leq L$) are allocated, as shown in FIG. 15.

When a new sub-station 2R is to be connected, the center wavelength of the optical signal of the sub-station 2R must be allocated and the beat detector 17 must check if the wavelengths of other sub-stations must be re-allocated.

Figure 15:
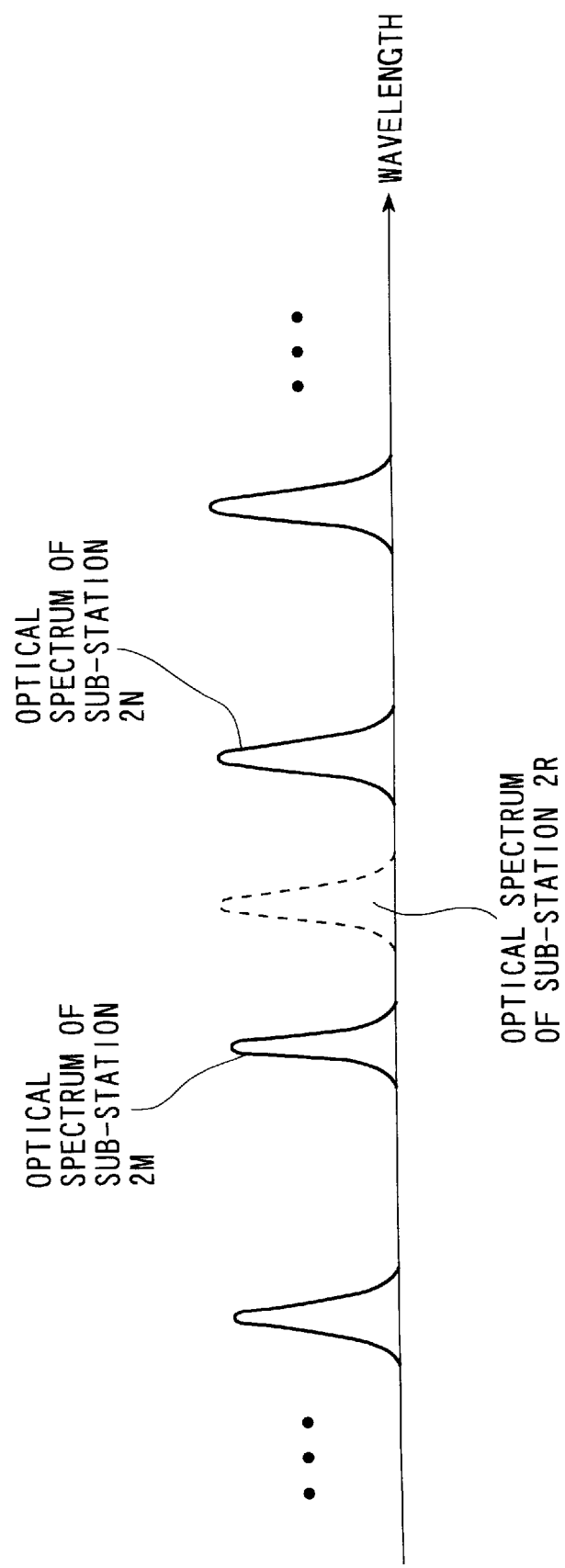
FIG. 15 is a graph for explaining the optical spectrum of sub-stations.

Assume that the sub-station 2R is newly connected between the wavelengths of the sub-stations 2M and 2N, as shown in FIG. 15. The wavelengths of the sub-stations 2M and 2N are periodically changed by control signals fmM and fmN.

Within the variable wavelength range of the sub-station 2R, the wavelength is fixed at a wavelength position λcR at which it can be changed toward both the long and short wavelength sides. The wavelength αcR of a light source is changed at the period of a frequency fmR. The optical power of the light source having the wavelength λcR is increased stepwise.

When the optical power level is increased abruptly, if the wavelength position λcR is inappropriate, large beat noise is produced, and influences the reception characteristics of information signals from other sub-stations 2. Hence, the beat detector 17 of the main station 1 must control to increase the optical power while confirming the presence/absence of beat noise.

Upon detection of beat noise, the increase in optical power is stopped, and an appropriate position of the wavelength λcR must be sought. When the variable wavelength range of the light source of the sub-station 2R is broad, if the wavelength λcR can be fixed by seeking a sufficiently broad wavelength band between an arbitrary pair of sub-stations that are immune to beat noise, the new sub-station 2R can be inserted without changing the wavelength allocation of other sub-stations, resulting in convenience.

For example, when the new sub-station 2R is connected, the wavelength λcR is changed across a broad range while the optical power level of the sub-station 2R is kept suppressed not to produce large beat noise, and wavelength allocation information of other sub-stations 2 is obtained from changes in detection result of beat noise at that time, thereby finding a position where the wavelength allocation of other sub-stations 2 need not be shifted. Then, λcR is fixed at that position.

Figure 16:
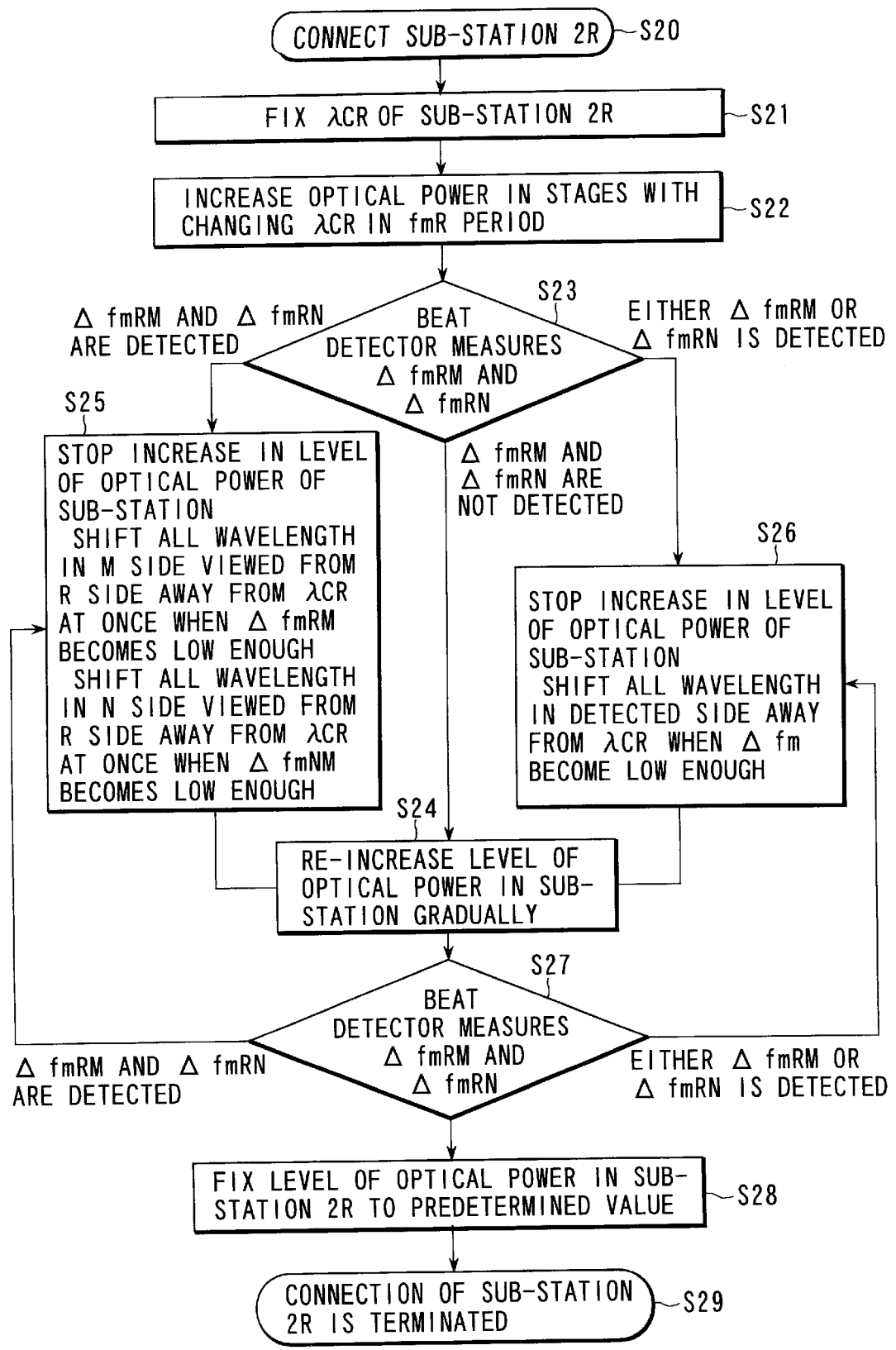
FIG. 16 is a flow chart showing the wavelength control algorithm.

However, when neither such sufficiently broad variable wavelength range nor sufficiently free wavelength spacing are available, the wavelength allocation of other sub-stations 2 must be changed. For this purpose, a wavelength control algorithm shown in, e.g., FIG. 16 is used.

The algorithm shown in FIG. 16 will be explained below. When the sub-station 2R is connected, its λcR is fixed, and optical power level is increased stepwise by changing λcR at a period fmR (S20 to S22), if the beat detector 17 does not detect one or both of ΔfmR,M=|fmR−fmM| and ΔfmR,N=|fmR−fmN| (S23), the wavelength λcR need not be shifted; if the beat detector 17 detects components ΔfmR,M or ΔfmR,N, λcR and the wavelength λc of other sub-stations must be re-allocated in some cases.

If one of the components ΔfmR,M and ΔfmR,N is detected, which of λcM and λcN λcR is closer to can be detected. In this case, the increase in optical power level of the sub-station 2R is stopped, and all the wavelengths on the detected side are separated away from λcR until Δfm becomes sufficiently small (S26). Then, the flow advances to step S24.

If it is determined in step S23 that the component ΔfmR,M alone is detected, the wavelengths λcR and λcN have an enough spacing, and λcR and λcM are close to each other.

In this case, as one wavelength control algorithm, for example, all the wavelengths λc on the side of the sub-station 2M viewed from the wavelength λcR of the sub-station 2R are controlled to be separated away from λcR until ΔfmR,M becomes sufficiently small (S26).

As another wavelength control algorithm, the wavelength λcR is controlled to be separated away from λcM. In this case, if no component ΔfmR,N is detected before ΔfmR,M becomes sufficiently small, λcR is fixed at a position where the component ΔfmR,M is sufficiently small.

However, if ΔfmR,N is detected, λcR is reset to and fixed at a certain position where ΔfmR,N is sufficiently small, and all the wavelengths on the side of the sub-station 2M viewed from the sub-station 2R are changed in a direction away from λcR until ΔfmR,M becomes sufficiently small.

On the other hand, if both ΔfmR,M and ΔfmR,N are detected, λcR is fixed at that position, and the wavelengths of all other sub-stations are shifted in a direction away from λcR until both the components ΔfmR,M and ΔfmR,N become sufficiently small (S25).

If all Δfm become small, the optical power level of the sub-station 2R is increased again (S24). If no beat noise is produced (S27), the power level is increased up to a power setting value (S28), thus completing connection of the sub-station 2R (S29).

On the other hand, if beat noise has been produced (S27) as a result of the re-increase in optical power level of the sub-station 2R in step S24, the wavelength allocation is controlled by the aforementioned algorithm again.

With this control, the new sub-station 2R can be connected without stopping transmission of information signals from the respective sub-stations 2, i.e., as the system is in service.

Note that the setup algorithm of the wavelength λcR is merely an example, and other wavelength allocation algorithms may be used.

In this embodiment, the main station 1 and sub-stations 2 are connected in a bus configuration, but may be connected in a star or ring configuration. Also, two-way transmission that transmits both upstream and downstream signals via a single optical fiber 3 is available. In case of two-way transmission, if the upstream and downstream signals have close optical wavelength values, large beat noise is likely be produced between the upstream and downstream signals due to the influences of reflection, Raman scattering, Brillouin scattering, and the like. For this reason, a large optical wavelength spacing must be assured between the upstream and downstream signals.

To restate, the wavelength control method for the optical communication system of this embodiment is characterized by comprising the following means. That is, upon connecting a new sub-station to the transmission path, the optical power of that sub-station is increased stepwise while the beat detector of the main station detects beat noise. Upon detection of beat noise, the increase in optical power is stopped, and the wavelength of the light source of the new sub-station is controlled. After beat noise ceases to be detected, the optical power is increased stepwise again.

Upon insertion of a new sub-station, the optical communication system is preferably in service. For this reason, when the optical signal power from the new sub-station is abruptly increased to a predetermined setting value, if the wavelength of that sub-station is not at an appropriate position, beat noise is produced, and influences information signals from other sub-stations. To prevent this, the optical signal power from the new sub-station must be increased stepwise in cooperation with the beat detector of the main station. According to the present invention, a communication system which can connect a new sub-station while in service and has high reliability can be provided.

As described above, according to the present invention, by checking the frequency component of beat noise produced by wavelength drifts of upstream signals from the sub-stations to the main station, a pair of sub-stations that have caused the beat noise can be specified by a simple arrangement. For this reason, the optical wavelength drifts of the sub-stations that have caused the beat noise can be adjusted by a simple control algorithm without controlling any sub-stations that have not taken part in production of beat noise, before signal transmission quality is impaired by beat noise.

With this arrangement, a highly reliable optical transmission system, which can obviate the need for a high-precision equipment or light source that serves as an absolute wavelength reference, can implement the wavelength multiplex technique by adding only a simple electric circuit, can perform wavelength control without impairing transmission quality even when beat noise begins to be produced, and can connect a new sub-station without interrupting signal transmission of other sub-stations, can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical communication system comprising:
    a plurality of sub-stations; and
    a main station connected to said plurality of sub-stations via an optical transmission path,
    wherein said plurality of sub-stations respectively comprise a modulation unit modulating a wavelength of an optical signal containing information signals, by using a control signal having a unique frequency allocated to the sub-station, which is transmitted from the respective sub-station to the main station via the optical transmission path, arbitrary pairs of control signals having different frequency differences, and
    said main station comprises:
        an extraction unit extracting a beat noise component from the optical signals modulated by the modulation unit; and
        a determination unit determining two sub-stations that have produced beat noise on the basis of frequency difference of an arbitrary pair of control signals contained in the beat noise component extracted by said extraction unit,
        wherein the main station outputs a wavelength control signal for changing the wavelength of the optical signal to one of the two determined sub-stations, and the one of the two determined sub-stations changes the wavelength of the optical signal based on the wavelength control signal.

2. A system according to claim 1,
    wherein the modulation unit directly modulates a semiconductor laser diode in intensity by using the information signals and control signal.

3. A system according to claim 1, wherein the modulation unit comprises:
    a generation unit generating a first optical signal by directly modulating a semiconductor laser diode by using the control signal; and
    an external optical modulator for modulating the first optical signal by using the information signal so as to obtain the optical signal modulated by the modulation unit.

4. A system according to claim 1, wherein when the number of said plurality of sub-stations is L (L is an integer not less than 3), fm1 to fmL respectively represent frequencies of the control signals of the optical signals of the L sub-stations, and two frequency differences between arbitrary pairs of the control signals are respectively given by:

$$\Delta fm = |fmM - fmN|, \Delta fm' = |fmO - fmP|$$

(M≠N, O≠P, M≠O, 1≦M, N, O, P≦L, and M, N, O, and P are integers) the two frequency differences satisfy:

$$\Delta fm \neq Q \times \Delta fm'$$

(Q is an integer) and,
    a maximum modulation-band frequency of information signals S to be transmitted from the sub-stations 1 to L to said main station,
    modulation signals fs1 to fsL falling within different frequency bands in the sub-stations 1 to L,
    a frequency difference between an arbitrary pair of the modulation signals fs1 to fsL, and
    the frequencies fm1 to fmL and the frequency difference Δfm satisfy:
        maximum modulation-band frequency of information signal S≦Δfm<fm1 to fmL, Δfs, fs1 to fsL.

5. A system according to claim 1, wherein said determination unit comprises:
    a detection unit detecting the beat noise component extracted by said extraction unit;
    a filter unit respectively extracting frequency difference components of the control signals from the beat noise component detected by said detection unit; and
    a specifying unit specifying the two sub-stations that have produced the beat noise on the basis of the frequency difference components extracted by said filter unit.

6. A system according to claim 1, wherein said determination unit comprises:
    a detection unit detecting the beat noise component extracted by said extraction unit;
    a formation unit sequentially forming signals having frequencies corresponding to the frequency differences of the control signals of the sub-stations;

a correlation unit outputting a signal indicating correlation between the beat noise component detected by said detection unit, and the signal formed by said formation unit; and a specifying unit specifying the two sub-stations that have produced the beat noise on the basis of the signal output from said correlation unit.

7. A system according to claim 1, further comprising:

an increasing unit increasing power of the optical signal transmitted from a new sub-station connected to the transmission path while detecting beat noise by said determination unit;

a stop unit stopping the increase in power of the optical signal transmitted from the newly connected sub-station when said determination unit detects the beat noise caused by the power of the optical signal transmitted from the newly connected sub-station and increased by said increasing unit;

a changing unit changing a wavelength of the optical signal transmitted from the newly connected sub-station and a wavelength of the optical signal transmitted from another sub-station when said stop unit stops the increase in power of the optical signal transmitted from the newly connected sub-station; and a unit increasing the power of the optical signal transmitted from the newly connected sub-station when said changing unit has changed the wavelengths of the optical signals transmitted from the newly connected sub-station and the other sub-station.

8. A system according to claim 1, wherein one of the two determined sub-stations changes the wavelength of the optical signal so as to reduce power of the frequency difference of the arbitrary pair of the control signal contained in the beat noise component extracted by the extraction unit.

9. An optical communication system comprising:

a plurality of sub-stations; and a main station connected to said plurality of sub-stations via an optical transmission path, wherein said plurality of sub-stations respectively comprise:

a modulation unit directly modulating a semiconductor laser diode in intensity by using an information signal to generate an optical signal which is transmitted from the respective sub-stations to the main station via the optical transmission path, and said main station comprises:

an extraction unit extracting a beat noise component from the optical signals from the modulation unit;

a detection unit detecting the beat noise component extracted by said extraction unit;

a unit acquiring the information signals of the sub-stations from the optical signals transmitted, and sequentially outputting signals indicating correlation between the beat noise component detected, and the information signals acquired; and a specifying unit specifying the two sub-stations that have produced the beat noise on the basis of the signals indicating the correlation sequentially output, wherein the main station outputs a wavelength control signal for changing the wavelength of the optical signal to one of the two specified sub-stations, and the one of the two specified sub-stations changes the wavelength of the optical signal based on the wavelength control signal.

10. A system according to claim 9, wherein the information signals are modulated by using a digital signal, and the unit for sequentially outputting executes correlation processing within one symbol time of the digital signal.

11. A system according to claim 9, further comprising:

a phase shift unit shifting phases of the information signals acquired, and sequentially outputting signals indicating correlation between the beat noise component detected, and the information signals shifted, wherein said specifying unit specifies the two sub-stations that have produced the beat noise based on the signals indicating correlation between the beat noise component detected, and the information signals shifted.

12. A system according to claim 11, wherein said phase shift unit shifts 90° the phases of the information signals acquired.

13. A system according to claim 9, further comprising:

an increasing unit increasing power of the optical signal transmitted from a new sub-station connected to the transmission path while detecting beat noise by said determination unit;

a stop unit stopping the increase in power of the optical signal transmitted from the newly connected sub-station when said determination unit detects the beat noise caused by the power of the optical signal transmitted from the newly connected sub-station and increased by said increasing unit;

a changing unit changing a wavelength of the optical signal transmitted from the newly connected sub-station and a wavelength of the optical signal transmitted from another sub-station when said stop unit stops the increase in power of the optical signal transmitted from the newly connected sub-station; and a unit increasing the power of the optical signal transmitted from the newly connected sub-station when said changing unit has changed the wavelengths of the optical signals transmitted from the newly connected sub-station and the other sub-station.

14. A control method for an optical communication system comprising:

transmitting optical signals containing information signals from a plurality of sub-stations to a main station based on control signals unique to the sub-stations via a transmission path, arbitrary pairs of the control signals having different frequency differences;

extracting a beat noise component from the transmitted optical signals;

determining two sub-stations that have produced beat noise on the basis of frequency difference of an arbitrary pair of control signals contained in the extracted beat noise component;

outputting a wavelength control signal for changing the wavelength of the optical signal from the main station to one of the two determined sub-stations; and changing the wavelength of the optical signal to be transmitted to the main station based on the wavelength control signal in the one of the two determined sub-stations.

15. A method according to claim 14, wherein when the number of said plurality of sub-stations is L (L is an integer not less than 3), fm1 to fmL respectively represent frequencies of the control signals of the optical signals of the L sub-stations, and two frequency differences between arbitrary pairs of the control signals are respectively given by:

$$\Delta fm = |fmM - fmN|, \Delta fm' = |fmO - fmP|$$

($M \neq N$, $O \neq P$, $M \neq O$, $1 \leq M, N, O, P \leq L$, and M, N, O, and P are integers) the two frequency differences satisfy:

$$\Delta fm \neq Q \times \Delta fm'$$

(Q is an integer) and,
a maximum modulation-band frequency of information signals S to be transmitted from the sub-stations 1 to L to said main station,
modulation signals fs1 to fsL falling within different frequency bands in the sub-stations 1 to L,
a frequency difference between an arbitrary pair of the modulation signals fs1 to fsL, and
the frequencies fm1 to fmL and the frequency difference $\Delta$fm satisfy:
maximum modulation-band frequency of information signal S<$\Delta$fm<fm1 to fmL, $\Delta$fs, fs1 to fsL.

16. A method according to claim 14, wherein the step of determining the two sub-stations comprises:
detecting the extracted beat noise component;
extracting frequency difference components of the control signals from the detected beat noise component by using the filters, respectively; and
specifying the two sub-stations that have produced the beat noise on the basis of the extracted frequency difference components.

17. A method according to claim 7, wherein the step of determining the two sub-stations comprises:
detecting the extracted beat noise component;
sequentially forming signals having frequencies corresponding to the frequency differences of the control signals of the sub-stations;
outputting a signal indicating correlation between the detected beat noise component, and the formed signal; and
specifying the two sub-stations that have produced the beat noise on the basis of the output signal.

18. A control method for an optical communication system comprising:
transmitting optical signals containing information signals from a plurality of sub-stations to a main station via a transmission path;
extracting a beat noise component from the optical signals transmitted;
acquiring information signals of the sub-stations from the optical signals transmitted;
outputting signals indicating correlation between the beat noise component extracted and information signal acquired;
determining two sub-stations that have produced beat noise based on the signals outputted;
outputting a wavelength control signal for changing the wavelength of the optical signal from the main station to one of the two determined sub-stations; and
changing the wavelength of the optical signal based on the wavelength control signal in the one of the two determined sub-stations.

19. A method according to claim 18, wherein the step of determining the two sub-stations comprises:
shifting phases of the information signals acquired; and
outputting second signals indicating correlation between the detected beat noise component, and the phase-shifted signals,
wherein the step of determining determines the two sub-stations that have produced the beat noise based on the second signals.

20. An optical communication system comprising:
a plurality of sub-stations; and a main station connected to said plurality of sub-stations via an optical transmission path,
wherein said plurality of sub-stations respectively comprise a modulation unit directly modulating a semiconductor laser diode in intensity by using an information signal and a control signal having a unique frequency allocated to the sub-stations to generate an optical signal, and
said main station comprises:
an extraction unit extracting a beat noise component from the optical signals; and
a determination unit determining sub-stations that have produced beat noise on the basis of control signal frequency contained in the beat noise component extracted by said extraction unit,
the main station outputs a wavelength control signal for changing the wavelength of the optical signal to the determined sub-stations and the one of the two determined sub-stations changes a wavelength of the optical signal based on the wavelength control signal.

21. A system according to claim 20, further comprising:
a unit increasing power of the optical signal transmitted from a new sub-station connected to the transmission path;
a unit stopping the increase in power of the optical signal transmitted from the newly connected sub-station when said determination unit detects the beat noise caused by the power of the optical signal transmitted from the newly connected sub-station and increased by said increasing unit.

22. A system according to claim 20, wherein one of the determined sub-stations changes the wavelength of the optical signal so as to reduce power of the control signal contained in the beat noise component extracted by the extraction unit.

23. A system according to claim 20, wherein when the number of said plurality of sub-stations is L (L is an integer not less than 3), fm1 to fmL respectively represent frequencies of the control signals of the L sub-stations, and
a maximum modulation-band frequency of information signals S to be transmitted from the sub-station 1 to L to said main station,
fs1 to fsL, respectively represent the frequencies of the information signals of the optical signals of the L sub-stations, satisfy:
S<fm1 to fmL<fs1 to fsL.

24. An optical communication system comprising:
a plurality of sub-stations; and a main station connected to said plurality of sub-stations via an optical transmission path,
wherein said plurality of sub-stations respectively comprise a modulation unit directly modulating a semiconductor laser diode in intensity by using an information signal having a unique frequency allocated to the sub-stations to generate an optical signal, and
said main station comprises:
extraction unit extracting a beat noise component from the optical signals;
determination unit determining sub-stations that have produced beat noise on the basis of information signal frequency contained in the beat noise component extracted by said extraction unit, the main station outputs a wavelength control signal for changing the wavelength of the optical signal to the determined sub-stations and the one of the determined sub-stations changes the wavelength of the optical signal based on the wavelength control signal.

25. A system according to claim 24, further comprising:

a unit for increasing power of the optical signal transmitted from a new sub-station connected to the transmission path;

a unit stopping the increase in power of the optical signal transmitted from the newly connected sub-station when said determination unit detects the beat noise caused by the power of the optical signal transmitted from the newly connected sub-station and increased by said increasing unit.

26. A system according to claim 24, wherein the determined sub-stations change the wavelength of the optical signal so as to reduce power of the control signal contained in the beat noise component extracted by the extraction unit.

27. A control method for an optical communication system, comprising:

directly modulating, in respective sub-stations, a semiconductor laser diode in intensity by using an information signal and a control signal having a unique frequency allocated to the sub-stations to generate an optical signal to be transferred to a main station;

extracting, in the main station, a beat noise component from the optical signals;

determining, in the main station, sub-stations that have produced beat noise on the basis of control signal frequency contained in the beat noise component extracted;

outputting a wavelength control signal for changing the wavelength of the optical signal from the main station to the determined sub-stations; and changing the wavelength of the optical signal based on the wavelength control signal in the determined sub-stations.

28. A control method for an optical communication system, comprising:

directly modulating, in respective sub-stations, a semiconductor laser diode in intensity by using an information signal having a unique frequency allocated to the sub-stations to generate an optical signal to be transferred to a main station;

extracting, in the main station, a beat noise component from the optical signals;

determining, in the main station, sub-stations that have produced beat noise on the basis of information signal in the beat noise component extracted;

outputting a wavelength control signal for changing the wavelength of the optical signal to the determined sub-stations from the main station to determined sub-stations; and changing the wavelength of the optical signal based on the wavelength control signal in the determined sub-stations.

* * * * *